US006686936B1

(12) United States Patent
Nason et al.

(10) Patent No.: US 6,686,936 B1
(45) **Date of Patent: *Feb. 3, 2004**

(54) ALTERNATE DISPLAY CONTENT CONTROLLER

(75) Inventors: D David Nason, Seattle, WA (US); Thomas C O'Rourke, Seattle, WA (US); Scott Campbell, Seattle, WA (US)

(73) Assignee: xSides Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/263,612

(22) Filed: Mar. 5, 1999

Related U.S. Application Data

(63) Continuation-in-part of application No. 09/246,040, filed on Feb. 5, 1999, now Pat. No. 6,337,717, which is a continuation-in-part of application No. 09/191,322, filed on Nov. 13, 1998, now Pat. No. 6,330,010, which is a continuation-in-part of application No. 08/975,268, filed on Nov. 21, 1997, now Pat. No. 6,018,332.

(60) Provisional application No. 60/088,478, filed on Jun. 5, 1998.

(51) Int. Cl.[7] ............................ G06F 3/14; G06F 17/30

(52) U.S. Cl. ........................ 345/778; 345/748; 345/968; 345/742; 345/791; 707/3; 709/323; 709/318

(58) Field of Search ................................ 345/778, 790, 345/788, 794, 791, 795–797, 800, 798, 802–803, 748, 968, 760; 1/788–805; 707/10, 3, 6; 709/201, 203, 217, 219, 328, 323, 318, 319, 321, 315

(56) References Cited

U.S. PATENT DOCUMENTS 4,476,464 A 10/1984 Hobbs ........................ 340/731
4,586,035 A 4/1986 Baker et al. ................ 340/712

(List continued on next page.)

FOREIGN PATENT DOCUMENTS

EP 0419765 A1 4/1991
EP 0 564 174 A2 10/1993

(List continued on next page.)

OTHER PUBLICATIONS

"Co–ordinating Multiple Graphical User Interfaces Video Access", IBM Technical Disclosure Bulletin, vol. 39, No. 5, May 1996, pp. 7–9, XP000584036, New York, U.S.

(List continued on next page.)

*Primary Examiner*—Raymond J. Bayerl
(74) *Attorney, Agent, or Firm*—Micheal J. Donohue; Davis Wright Tremaine LLP

(57) ABSTRACT

An alternate display content controller provides a technique for controlling a video display separately from and in addition to the content displayed on the operating system monitor. Where the display is a computer monitor, the alternate display content controller interacts with the computer utility operating system and hardware drivers to control allocation of display space and create and control one or more parallel graphical user interfaces adjacent the operating system desktop. An alternate display content controller may be incorporated in either hardware or software. As software, an alternate display content controller may be an application running on the computer operating system, or may include an operating system kernel of varying complexity ranging from dependent on the utility operating system for hardware system services to a parallel system independent of the utility operating system and capable of supporting dedicated applications. The alternate display content controller may also include content and operating software delivered over the internet or any other LAN. The alternate display content controller may also be included in a television decoder/settop box to permit two or more parallel graphical user interfaces to be displayed simultaneously.

42 Claims, 16 Drawing Sheets

U.S. PATENT DOCUMENTS 4,642,790 A 2/1987 Minshull et al. ............ 364/900
4,649,499 A 3/1987 Sutton et al. ............... 364/518
4,710,761 A 12/1987 Kapur et al. ................ 340/721
4,868,765 A 9/1989 Diefendorff ................. 364/521
4,899,136 A 2/1990 Beard et al. ................ 340/706
4,972,264 A 11/1990 Bishop et al. .............. 358/183
5,001,697 A 3/1991 Torres ........................ 364/521
5,036,315 A 7/1991 Gurley ....................... 340/721
5,060,170 A 10/1991 Bourgeois et al. .......... 364/521
5,072,412 A 12/1991 Henderson, Jr. et al. .... 395/159
5,119,082 A 6/1992 Lumelsky et al. .......... 340/731
5,146,556 A 9/1992 Hullot et al. ............... 395/159
5,202,961 A 4/1993 Mills et al. ................. 395/159
5,305,435 A 4/1994 Bronson ..................... 395/159
5,339,390 A 8/1994 Robertson et al. .......... 395/157
5,367,623 A 11/1994 Iwai et al. .................. 395/157
5,367,658 A 11/1994 Spear et al. ................ 395/425
5,371,871 A 12/1994 Spilo .......................... 395/425
5,394,521 A 2/1995 Henderson, Jr. et al. .... 395/158
5,418,572 A 5/1995 Nonweiler et al. ......... 348/446
5,434,969 A 7/1995 Heilveil et al. ............. 395/166
5,473,745 A 12/1995 Berry et al. ................ 395/157
5,491,795 A 2/1996 Beaudet et al. ............ 395/159
5,500,934 A 3/1996 Austin et al. .............. 395/755
5,513,342 A 4/1996 Leong et al. ............... 395/157
5,521,614 A 5/1996 Kotha et al. ................ 345/128
5,561,471 A 10/1996 Kim et al. .................. 348/565
5,568,603 A 10/1996 Chen et al. ................. 395/155
5,586,244 A 12/1996 Berry et al. ................ 395/340
5,617,526 A 4/1997 Oran et al. ................. 395/326
5,619,639 A 4/1997 Mast .......................... 395/326
5,621,428 A 4/1997 King et al. ................. 345/118
5,621,904 A 4/1997 Elliott et al. ................ 395/342
5,625,782 A 4/1997 Soutome et al. ............ 395/341
5,631,825 A 5/1997 van Weele et al. ......... 364/188
5,651,127 A 7/1997 Gove et al. ................. 395/412
5,652,851 A 7/1997 Stone et al. ................ 395/346
5,673,403 A 9/1997 Brown et al. ............... 395/335
5,675,755 A 10/1997 Trueblood .................. 395/346
5,704,050 A 12/1997 Redpath ..................... 395/339
5,724,104 A 3/1998 Eom .......................... 348/569
5,742,285 A 4/1998 Ueda .......................... 345/342
5,742,797 A 4/1998 Celi, Jr. et al. ............. 395/507
5,745,109 A 4/1998 Nakano et al. ............. 345/340
5,745,762 A 4/1998 Celi, Jr. et al. ............. 395/681
5,757,386 A 5/1998 Celi, Jr. et al. ............. 345/507
5,764,964 A 6/1998 Dwin et al. ................. 395/509
5,771,042 A 6/1998 Santos-Gomez ............ 345/342
5,793,438 A 8/1998 Bedard ....................... 348/569
5,796,393 A 8/1998 MacNaughton et al. .... 345/329
5,812,132 A 9/1998 Goldstein ................... 345/345
5,818,416 A 10/1998 Hwang ....................... 345/127
5,825,357 A 10/1998 Malamud et al. ........... 345/340
5,831,592 A 11/1998 Cahill, III ................... 345/127
5,838,296 A 11/1998 Butler et al. ................ 345/127
5,847,709 A 12/1998 Card et al. .................. 345/355
5,864,347 A 1/1999 Inoue ......................... 345/516
5,874,937 A 2/1999 Kesatoshi ................... 345/127
5,874,958 A 2/1999 Ludolph ..................... 345/339
5,874,965 A 2/1999 Takai et al. ................. 345/357
5,940,077 A 8/1999 Amro ......................... 345/342
5,940,610 A 8/1999 Baker et al. ................ 395/559
5,995,120 A 11/1999 Dye ........................... 345/509
6,002,411 A 12/1999 Dye ........................... 345/521
6,008,803 A 12/1999 Rowe et al. ................ 345/327
6,018,332 A * 1/2000 Nason et al. ............... 345/127
6,025,841 A 2/2000 Finkelstein et al. ......... 345/342
6,025,884 A 2/2000 Choi .......................... 348/565
6,067,098 A 5/2000 Dye ........................... 345/521
6,091,430 A 7/2000 Bodin et al. ................ 345/510
6,094,230 A 7/2000 Han ........................... 348/564
6,108,014 A 8/2000 Dye ........................... 345/507
6,151,059 A 11/2000 Schein et al. ................. 348/13
6,172,669 B1 1/2001 Murphy et al. ............. 345/199
6,185,629 B1 2/2001 Simpson et al. .............. 710/10
6,320,577 B1 11/2001 Alexander .................. 345/339
6,356,284 B1 3/2002 Manduley et al. .......... 345/779
6,426,762 B1 7/2002 Nason et al. ............... 345/788
6,437,809 B1 8/2002 Nason et al. ............... 345/778

FOREIGN PATENT DOCUMENTS

EP 0747805 A1 12/1996
JP 11167478 6/1999
TW 302453 4/1997
TW 357304 5/1999
WO WO 96 34467 10/1996
WO WO 97/21183 6/1997
WO WO 99/27517 6/1999

OTHER PUBLICATIONS

U.S. patent application Ser. No. 09/344,409, Porter, filed Jun. 24, 1999.

U.S. patent application Ser. No. 09/517,874, Porter, filed Mar. 02, 2000.

Brunhoff, "Pleasing the Eye," *Unix Review* 7(10):65–72, 1989.

Cohen et al., "Constraint–Based Tiled Windows," *IEEE Computer Society Press*, pp. 35–45, 1986.

Gancarz, "Uwm: A User Interface for X Windows," *Summer Conference Proceedings*, USENIX Association, Jun. 9–13, 1986, pp. 429–440.

Lantz and Rashid, "Virtual Terminal Management in a Multiple Process Environment," *Proceedings of the Seventh Symposium on Operating System Principles*, Association for Computing Machinery, Dec. 10–12, 1979, pp. 86–97.

Meyrowitz and Moser, "Bruwin: An Adaptable Design Strategy for Window Manager/Virtual Terminal Systems," *Proceedings of the Eighth Symposium on Operating Systems Principles*, Association for Computing Machinery, Dec. 14–16, 1981, pp. 180–189.

Stille et al., "A $^2$DL–An Adaptive Automatic Display Layout System," *Third Annual Symposium on Human Interaction with Complex Systems HICS '96,*, IEEE Computer Society Press, pp. 243–250.

"Control Strip en Desktop Strip," *Apple World Magazine*, pp. 6132–6133, XP002152897, Jul.–Aug. 1995.

"Flexible Tool Bar," *IBM Technical Disclosure Bulletin 36*(08):91, XP000390153, Aug. 1993.

"Internet Kiosk Touch Panel Shell," *IBM Technical Disclosure Bulletin 39*(08):85–87, XP000638146, Aug. 1996.

"Method and Apparatus for a Graphical Dial Interface," *IBM Technical Disclosure Bulletin 37*(01):403, XP000428826, Jan. 1994.

"Single–Click Action Buttons," *IBM Technical Disclosure Bulletin 37*(03):93, XP000441391, Mar. 1994.

"Three–Dimensional Selection Widget," *IBM Technical Disclosure Bulletin 38*(02):423, XP000502528, Feb. 1995.

Van Name et al, "Easing the RAM–Cram Blues," *Byte 15*(3):227–228, 230, 232, XP000652459, Mar. 1990.

* cited by examiner

ALTERNATE DISPLAY CONTENT CONTROLLER

RELATED APPLICATIONS

This application is a continuation-in-part of application Ser. No. 09/246,040, filed Feb. 2, 1999, now U.S. Pat. No. 6,337,717, which is a continuation-in-part of application Ser. No. 09/191,322, filed Nov. 13, 1998, now U.S. Pat. No. 6,330,010, which is a continuation-in-part of application Ser. No. 08/975,268, filed Nov. 21, 197, now U.S. Pat. No. 6,018,332 the priority of which are hereby claimed, and also claims the priority of provisional application Ser. No. 60/088,478 filed Jun. 5, 1998.

BACKGROUND OF THE INVENTION

1. Field of the Invention

This invention relates to user interface displays and, in particular, the use of a parallel user interface separate from the standard user interface display.

2. Description of the Prior Art

There was a time when the most popular operating system for personal computers (DOS) did not include a graphical user interface. Any company could create a "menu" or "shell" which would be the first program launched upon starting the computer and which would present options to the user for launching and managing various applications. Although graphics programming was difficult in the DOS environment, some companies even created graphical user interfaces that could then launch other programs.

Microsoft Corporation of Redmond, Wash., introduced such a graphical user interface for launching applications which it called "Windows". The first three versions of Windows were merely applications which ran under DOS and could be one of numerous items to be selected from a previously running shell or menu which might be offered by a company other than Microsoft. This continued to allow other companies to offer primary user interface programs to users without the user going through a Microsoft controlled user interface.

However, with the introduction by Microsoft of Windows 95™, the initial loading of the operating system presents a Microsoft-developed graphical user interface (GUI) at the outset, which occupies the entire screen display. This operating system created GUI is commonly known as a "desktop". As with its previous operating system products, Microsoft arranged with manufacturers of the standard computer hardware to include this operating system with each computer sold. Microsoft's OEM licensing restrictions prevent vendors from altering, obscuring, or preceding the Microsoft desktop display. The Windows environment also presumes its ownership of the entire display and is designed in ways that assume that it can write to any screen location at any time. With Microsoft's domination of this market, it became impossible for other software vendors to present an interface to users other than as a Microsoft style icon within the Microsoft "desktop" consisting of the entire screen display. This prompted a need for access to a user interface which could be presented outside of the standard computer screen display and therefore independent of the dictates of Microsoft for items within its "desktop".

Standard personal computers use VGA or Super VGA or XGA video display systems. These display systems operate in standardized graphics modes such as 640×480 pixels, 800×600 pixels, 1024×768 pixels, and 1280×1024 pixels. When one of these display modes is selected, this is the entire area available for display. In the Microsoft Windows environment, the user instructs the Windows operating system to select one of these standard display modes and the Windows operating system then presents all of the applications and their icons within the selected display area. There is no way at present to cause the Windows "desktop" to use less than the entire display area and still function as intended and allow another program from another vendor to control the remainder. What is needed is the ability to designate a portion of video memory a separate from the Windows desktop, and to make sure that Windows functions normally but at the same time cannot obstruct anything subsequently allocated into that space

SUMMARY OF THE INVENTION

A first aspect of the present invention includes a technique for controlling allocation and content of display space among one or more user interfaces, operating systems or applications permitting an application or parallel graphical user interface (GUI) to operate outside the desktop, the area designated for display of the operating system interface and it's associated applications. In a first aspect, a computer operating under the control of any utility operating system such as Microsoft Windows™, Linux, Apple O/S or Unix may have the allocation of visible display controlled by the present invention. The operating system desktop may be scaled and/or moved to a specific area of the display permitting a parallel GUI to operate in the open area. The present invention may be an application operating under the primary or utility operating system or it may be combined with an operating system kernel to control the display and content in the parallel display.

Another aspect of the present invention includes a technique provided for adding and using a parallel graphical user interface adjacent to the standard user graphical display interface, for example in the border beyond the standard screen display area. Conventional video systems, such as VGA, SVGA and XGA video systems, include a defined border surrounding the display area. The original purpose of this border was to allow adequate time for the horizontal and vertical retrace of the electron gun in a cathode ray tube display. However, with the advent of LCD displays and as retrace speeds have increased in modern monitors, it is now possible to present a user interface display in this border. The border which can be controlled as a user interface is a portion of what is known as the "overscan". This invention is a method for presenting one or more additional or secondary user interfaces, for example, in the overscan area surrounding the conventional user interface display often called the desktop.

When the electron gun in a CRT retraces to the left of the screen or the top of the screen, it requires a significant amount of time relative to the presentation of a scanned line of data. During the retrace, the electron gun is turned off ("blanked"). If the blanking time required for the retrace is equal to the amount of time available, there is no usable overscan. However, modern monitors have become much faster in their retrace speeds, leaving a significant amount of time when the electron gun need not be blanked, allowing a displayable border. In the prior art, although the border is usually "black" (the gun is turned off), it is well known how to specify that the border shall be given any one of six colors. Standard BIOS allows a specification of this color. The desired color is simply specified in one of the registers for the video controller. Typically no data for this color is stored in the buffer of video memory for the display. This invention establishes an additional video buffer for the border and allows this buffer to be written with display data like the regular display buffer. The additional video buffer is often present but unused in the graphics systems of most computers because video memory is usually implemented in sizes that are powers of 2 e.g. "512K", whereas standard desktop dimensions are not "e.g. 640×480=300K". The display area is thereby expanded, on one or more edges, to provide a visible area previously invisible. The pixels within this newly visible area of the display are made accessible to programs through an application programming interface (API) component of this invention. A program incorporating a parallel graphical user interface may be displayed in the previously blanked area of the display, functionally increasing the accessible area of the display without hardware modification. In other cases the desktop may be increased or decreased to non-standard sizes.

A further aspect of the present invention includes a method for displaying an image on a video display system in an area outside of the primary display area generated by the video display system. Two dimensions define the standard display area, each specifying a number of pixels. Selecting a video "mode" specifies these dimensions. The method is accomplished by adjusting parameters for the video display system to increase the number of pixels in at least one dimension of the display system. The number of pixels which is added is less than or equal to the difference between the number of pixels specified in the video mode and a maximum number of pixels which the video display system can effectively display. Any such difference is defined here as the overscan area. Thus, the overscan area may be the difference between the current desktop video mode and the display capability of the display device or more specifically, any portion of video memory unused when the operating system is in a given screen dimension. Because all interface displays are created by writing a desired image to a buffer or memory for the video display, the method requires allocating additional video display memory for the increased pixels. The image written to such memory is then displayed by the system alongside the original display area.

In a still further aspect of the present invention, only the vertical dimension is increased and the overscan user interface is presented above or below the primary display area. Alternatively, the horizontal dimension may be increased and the overscan user interface displayed to the right or the left of the primary display area. Similarly, the interface image may be displayed on any or all of the four sides of the primary display area.

In another still further aspect of the present invention, a parallel GUI is provided that includes access to existing search engines and browsers. In another embodiment, the parallel GUI includes a search engine and/or browser. A search engine and/or browser using the present invention may be opened in either the overscan space or a space within or over the operating system display.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF A PREFERRED EMBODIMENT

The present invention includes techniques for providing and using an additional user interface, preferably a secondary graphical user interface or parallel GUI, to be present on the display at least apparently simultaneously with the primary user interface, such as the conventional desktop GUI.

Figure 1:
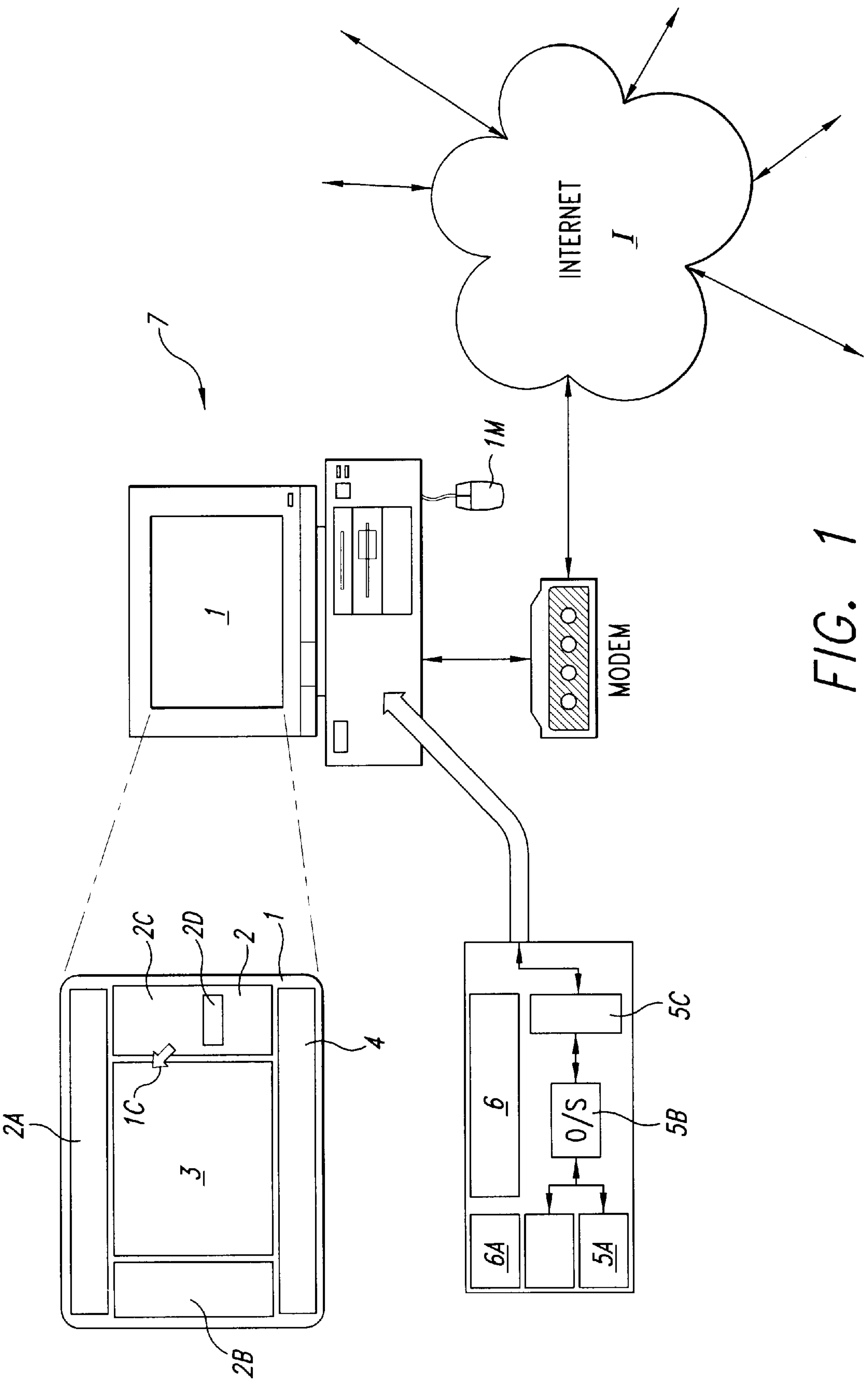
FIG. 1 is a block diagram of a first embodiment of the present invention.
Figure 2:
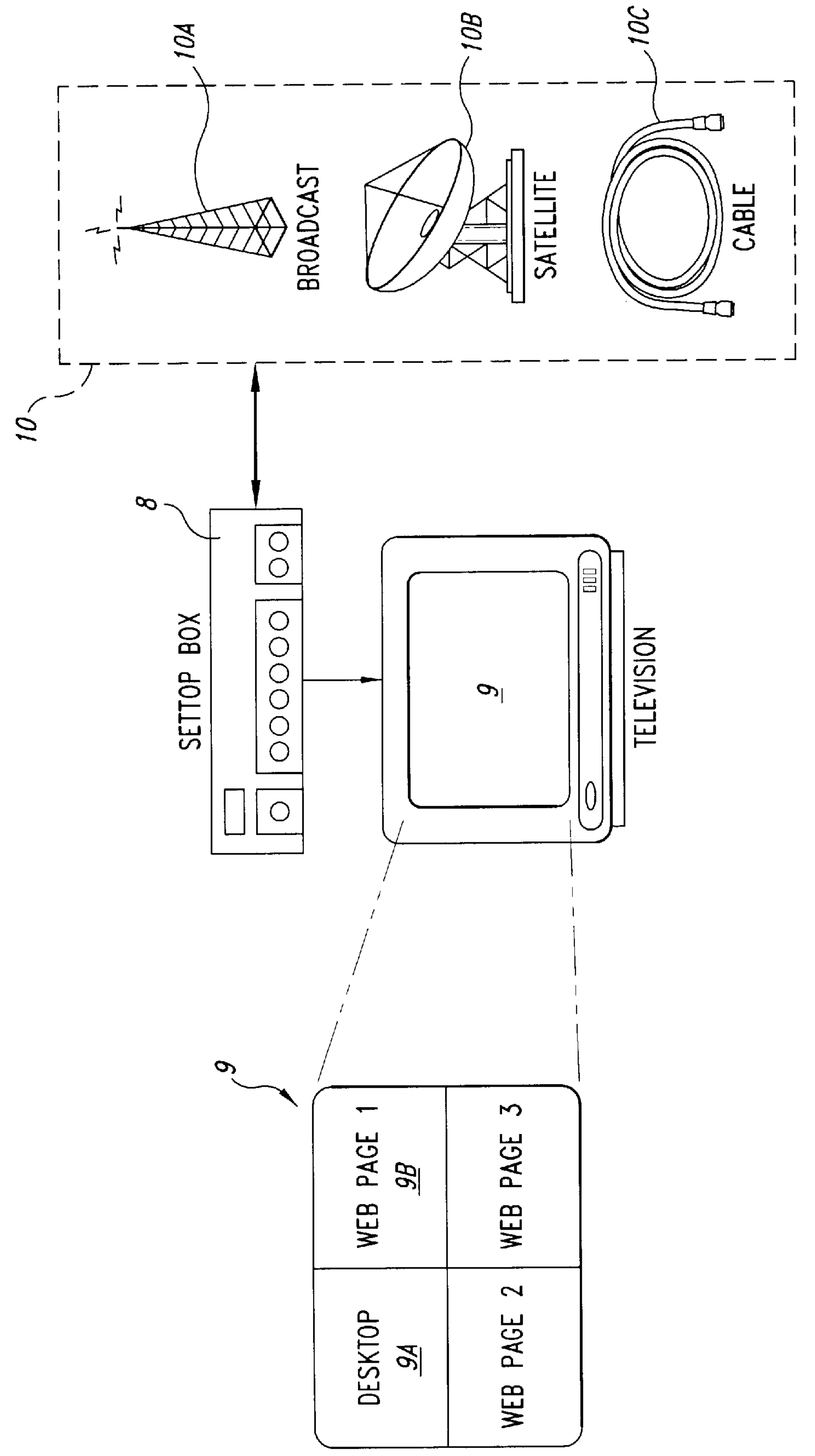
FIG. 2 is a block diagram of a second embodiment of the present invention.

Referring now to FIGS. 1 and 2, in a preferred embodiment, programming mechanisms and interfaces in a video display and control system such as computer system 7 or settop box 8 provide one or more parallel GUIs such as space 2C and/or space 4 in a display area such as display area 1 or display area 9 by providing access and visibility to a portion of the display otherwise ignored and/or inaccessible (hereinafter "overscan area"). Display areas'such as display area 1 or display area 9 may be created on any type of analog or digital display hardware including but not limited to CRT, TFT, LCD and flat panel.

Alternate display content controller 6 interacts with the computer utility operating system 5B and hardware drivers 5C to control allocation of display space 1 and create and control one or more parallel graphical user interfaces such as context sensitive network browser (CSNB) 2 and internet pages 2A and 2B adjacent the operating system desktop 3. Alternate display content controller 6 may be incorporated in either hardware or software. As software, an alternate display content controller may be an application running on the computer operating system, or may include an operating system kernel of varying complexity ranging from dependent on the utility operating system for hardware system services to a parallel system independent of the utility operating system and capable of supporting dedicated applications. The alternate display content controller may also include content and operating software such as JAVA delivered over the Internet I or any other LAN.

The alternate display content controller may also be included in a television decoder/settop box such as box 8 to permit two or more parallel graphical user interfaces such as pages 9A and 9B to be displayed simultaneously. The present invention may be compatible with conventional television formats such as NTSC, PAL, PAL-C, SECAM and MESECAM. In this configuration content and software may be delivered over any conventional delivery medium 10 including but not limited to over the air broadcast signals 10A, cable 10C, optical fiber, and satellite 10B.

FIGS. 1 and 2 will be referenced in more detail later in the application.

Figure 15:
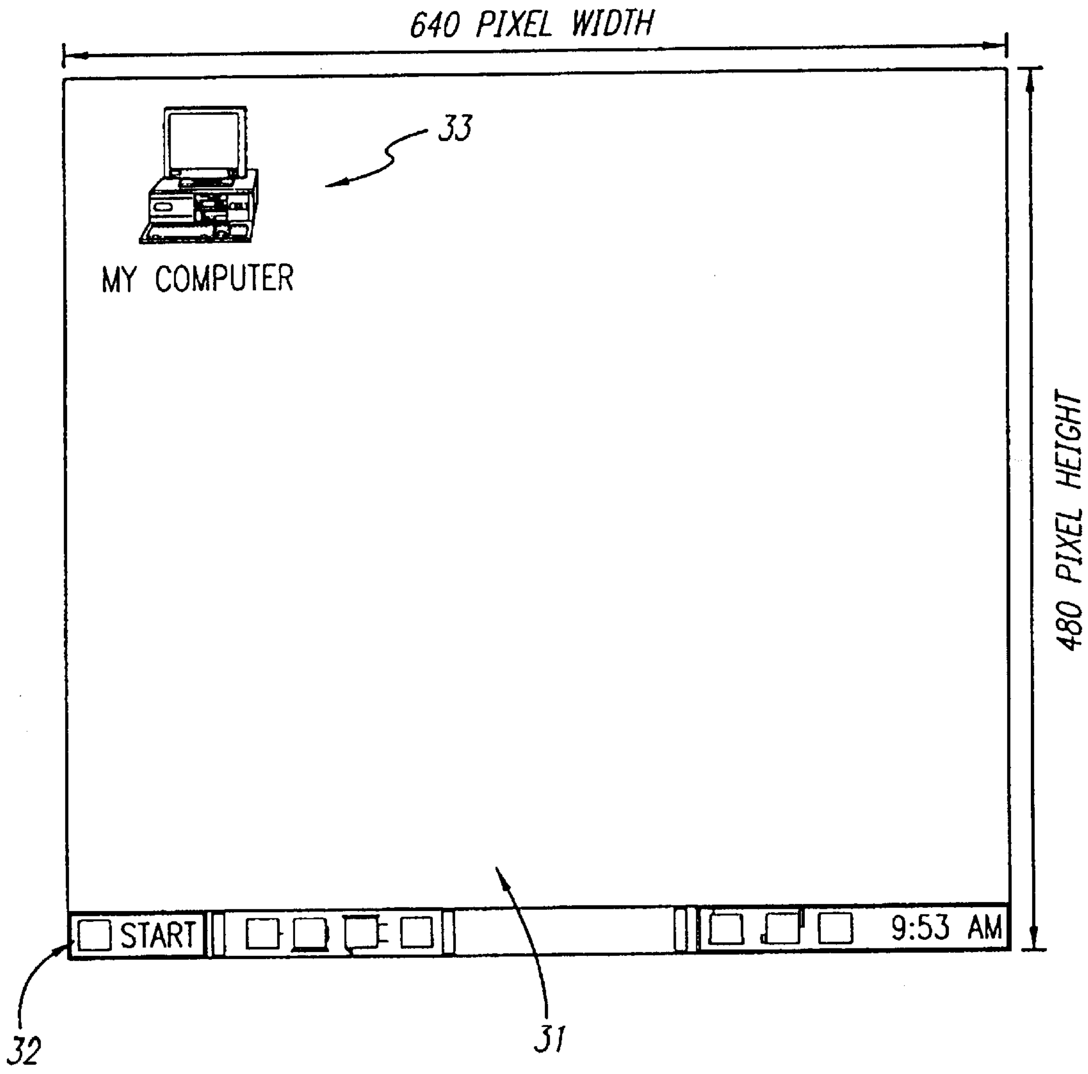
FIG. 15 PRIOR ART
FIG. 15 is a diagram of a standard display of the prior art.

FIG. 15 shows a standard prior art display desktop generated by a Microsoft Windows 95™ operating system. Within the desktop 31 are the taskbar 32 and desktop icons 33.

Figure 3:
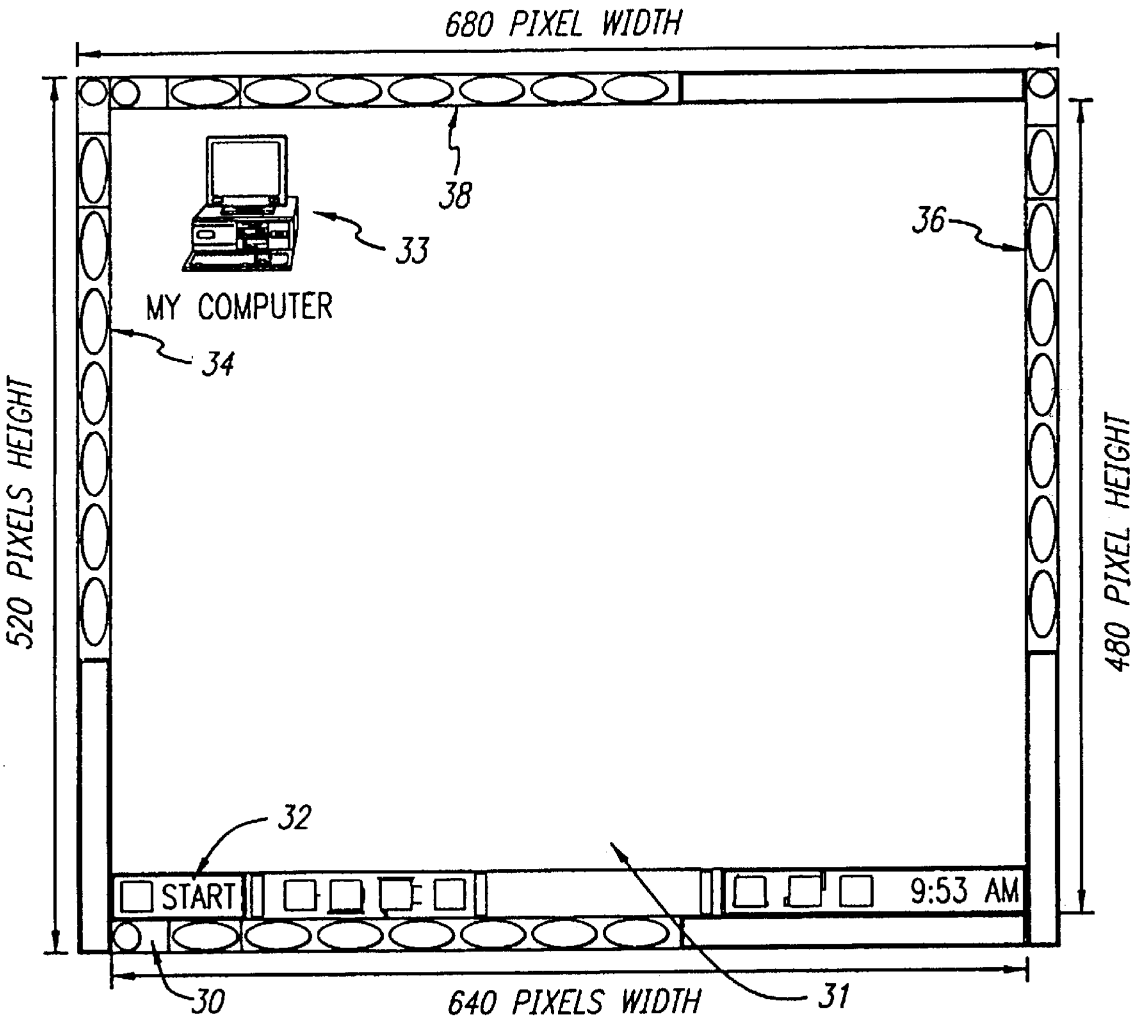
FIG. 3 is a diagram of a standard display with an overscan user interface on all four borders of the display.
Figure 16:
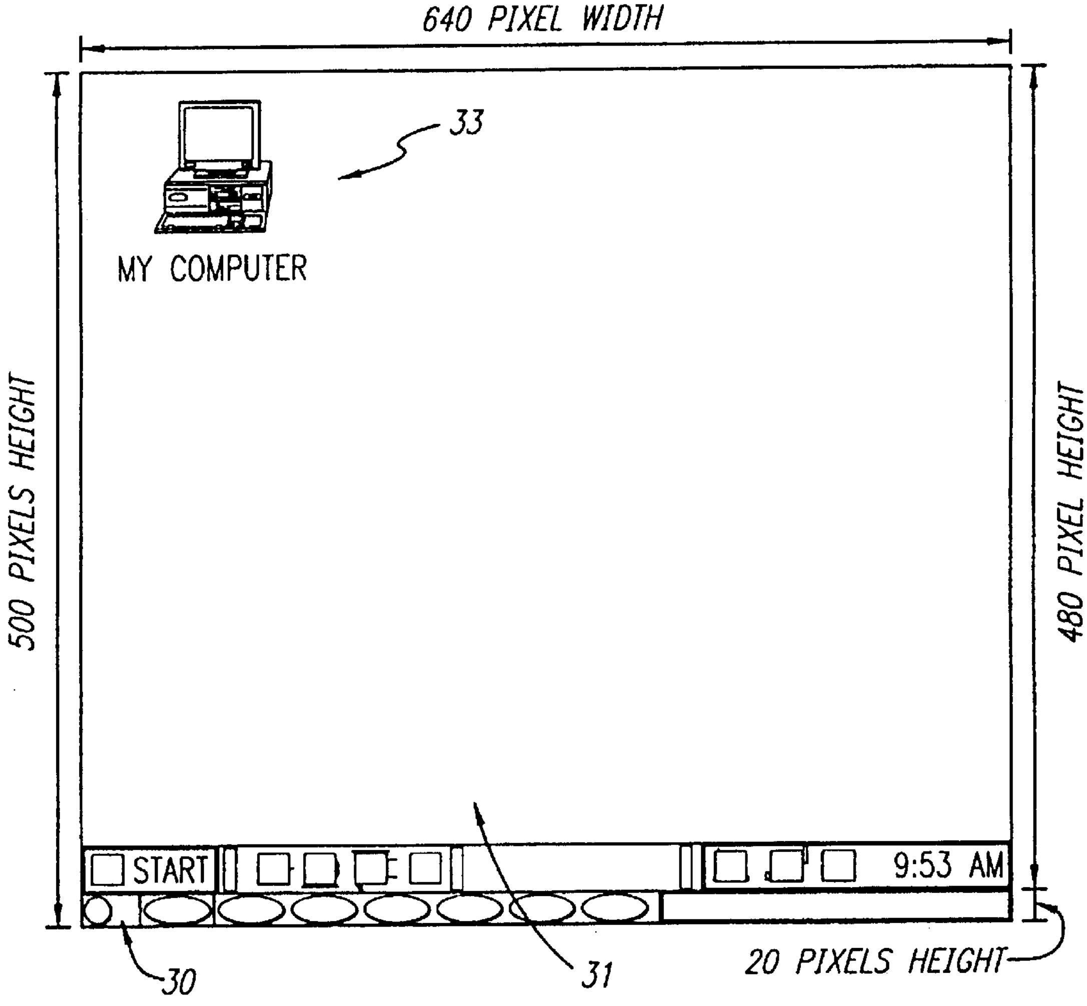
FIG. 16 is a diagram of a standard display with an overscan user interface in the bottom overscan area.

In a preferred embodiment of the present invention, a graphical user interface image is painted onto one or more of the sides of the overscan area as shown in FIG. 3. FIG. 3 is a depiction of a Super VGA (SVGA) display with the addition of a graphical bar user interface displayed in the overscan area. The overscan user interface bar 30 is defined to reside outside the borders of the "desktop" display area 31. In FIG. 16, the display is modified to include a graphical user interface 30 in a bar 20-pixels high below the bottom edge. In FIG. 3, the display is modified to include a graphical user interface in four bars each 20-pixels high/wide outside each of the four display edges: a bottom bar 30, a left side bar 34, a right side bar 36, and a top bar 38.

The overscan interface may include, and is riot limited to, buttons, menus, application output controls (such as a "ticker window"), animations, and user, input controls (such as edit boxes). Because the overscan interface is not obscured by other applications running within the standard desktop, the overscan interface may be constantly visible or it may toggle between visible and invisible states based upon any of a number of programming parameters (including, but not limited to, the state of the active window, the state of a toggle button, etc.).

Figure 4:
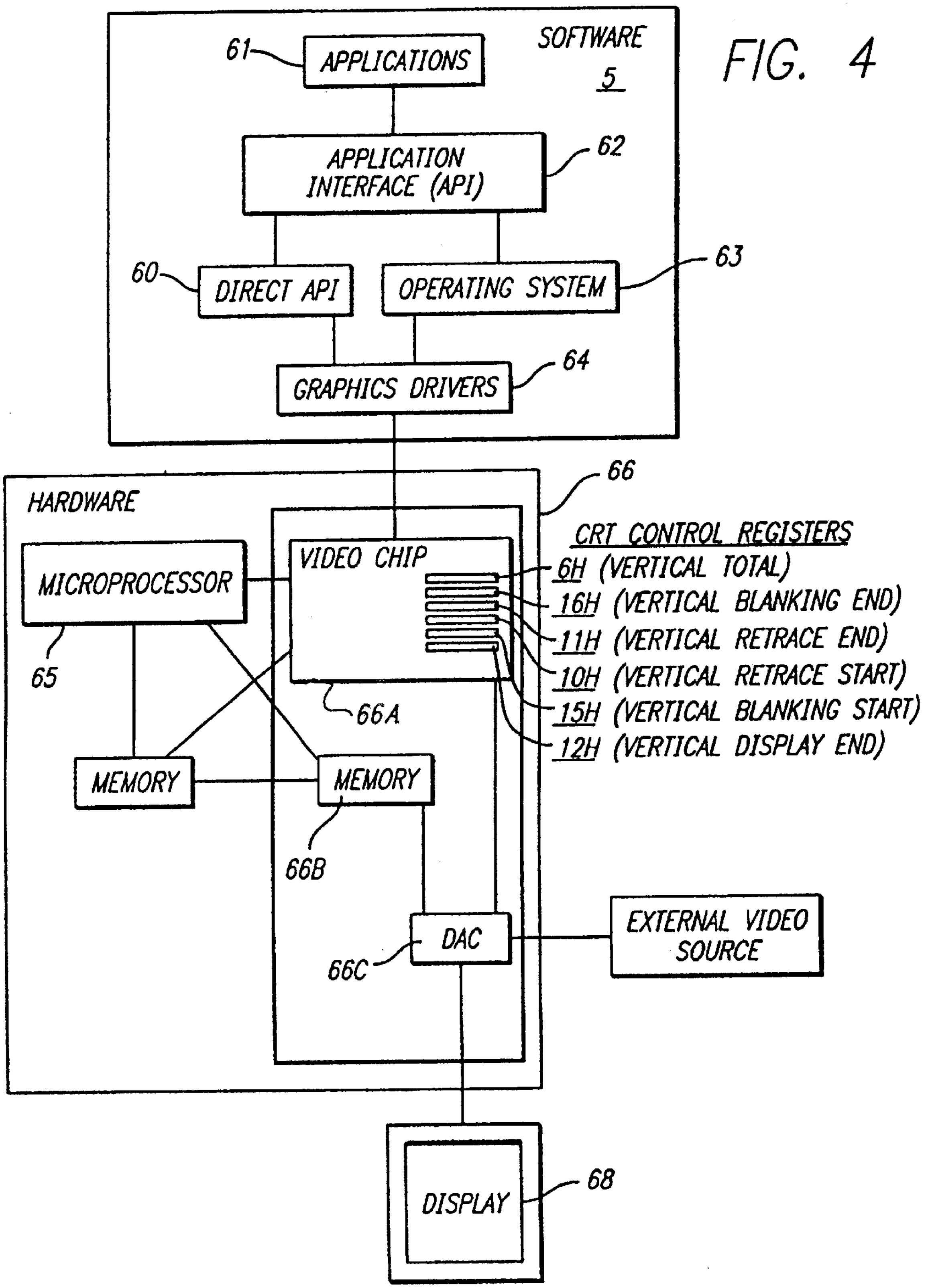
FIG. 4 is a block diagram of the basic components of the present invention.

FIG. 4 is a block diagram of the basic components of the present invention. Within the software component S are the operating system 63 and one or more applications such as application 61. Within the protected modes of modern systems, applications 61 do not have direct access to the video or Graphics Drivers 64 or hardware components such as the video card 66 which contains the video chipset 66A, 66B and 66C. Abstraction layers such as Application Interface (API) 60, and/or Direct API 62, provide limited access, often through the operating system 63.

The invention provides a technique for painting and accessing an area of the computer display not accessible, or used, in the operative desktop graphics modes. In the Microsoft Windows environments (including Microsoft Window 95 and derivatives, and Microsoft Windows NT 4.0 and derivatives) and other contemporary operating environments, the primary display area "desktop" is usually assigned by the operating system to be one of a set of pre-determined video "modes" such as those laid out in Tables 1 and 2 below, each of which is predefined at a specific pixel resolution. Thus, the accessible area of the computer display may not be modified except by selecting another of the available predefined modes.

TABLE 1

ROM BIOS video modes

| Mode Number | Resolution | Mode Colors | Buffer Type | Segment |
|---|---|---|---|---|
| 00H | 42x25 chars (320x350 pixels) | 16 | Alpha | B800 |
| 00H | 42x25 chars (320x350 pixels) | 16 | Alpha | B800 |
| 00H | 42x25 chars (320x400 pixels) | 16 | Alpha | B800 |
| 00H | 42x25 chars (320x400 pixels) | 16 | Alpha | B800 |
| 01H | 42x25 chars (320x200 pixels) | 16 | Alpha | B800 |
| 01H | 42x25 chars (320x350 pixels) | 16 | Alpha | B800 |
| 01H | 42x25 chars (320x400 pixels) | 16 | Alpha | B800 |
| 01H | 42x25 chars (320x400 pixels) | 16 | Alpha | B800 |
| 02H | 80x25 chars (640x200 pixels) | 16 | Alpha | B800 |
| 02H | 80x25 chars (640x350 pixels) | 16 | Alpha | B800 |
| 02H | 80x25 chars (640x400 pixels) | 16 | Alpha | B800 |
| 02H | 80x25 chars (640x400 pixels) | 16 | Alpha | B800 |
| 03H | 80x25 chars (640x200 pixels) | 16 | Alpha | B800 |
| 03H | 80x25 chars (640x350 pixels) | 16 | Alpha | B800 |
| 03H | 80x25 chars (640x400 pixels) | 16 | Alpha | B800 |
| 03H | 80x25 chars (720x400 pixels) | 16 | Alpha | B800 |
| 04H | 320x200 pixels | 4 | Graphics | B800 |
| 05H | 320x200 pixels | 4 | Graphics | B800 |
| 06H | 840X200 pixels | 2 | Graphics | B800 |
| 07H | 80x25 chars (720x350 pixels) | 2 | Alpha | B000 |
| 07H | 80x25 chars (720x400 pixels) | 2 | Alpha | B000 |
| 0DH | 320x200 pixels | 16 | Graphics | A000 |
| 0EH | 640x200 | 16 | Graphics | A000 |
| 0FH | 640x350 | 4 | Graphics | A000 |
| 10H | 640x350 | 4 | Graphics | A000 |
| 10H | 640x350 | 16 | Graphics | A000 |
| 11H | 640x480 | 2 | Graphics | A000 |
| 12H | 640x480 | 16 | Graphics | A000 |
| 13H | 640x200 | 256 | Graphics | A000 |

TABLE 2

SVGA video modes defined in the VESA BIOS extension

| Mode Number | Resolution | Mode Colors | Buffer Type |
|---|---|---|---|
| 100H | 640x480 pixels | 256 | Graphics |
| 101H | 640x480 pixels | 256 | Graphics |
| 102H | 800x600 pixels | 16 | Graphics |
| 103H | 800x600 pixels | 256 | Graphics |
| 104H | 1024x768 pixels | 16 | Graphics |
| 105H | 1024x768 pixels | 256 | Graphics |
| 106H | 1280x1024 pixels | 16 | Graphics |
| 107H | 1280x1024 pixels | 256 | Graphics |
| 108H | 80x60 chars | 16 | Alpha |
| 109H | 132x25 chars | 16 | Alpha |
| 10AH | 132x43 chars | 16 | Alpha |
| 10BH | 132x50 chars | 16 | Alpha |
| 10CH | 132x60 chars | 16 | Alpha |
| 10DH | 320x200 pixels | 32,768 | Graphics |
| 10EH | 320x200 pixels | 65,536 | Graphics |
| 10FH | 320x200 pixels | 16,777,216 | Graphics |
| 110H | 640x480 pixels | 32,768 | Graphics |
| 111H | 640x480 pixels | 65,536 | Graphics |
| 112H | 640x480 pixels | 16,777,216 | Graphics |
| 113H | 800x600 pixels | 32,768 | Graphics |
| 114H | 800x600 pixels | 65,536 | Graphics |
| 115H | 800x600 pixels | 16,777,216 | Graphics |
| 116H | 1024x788 pixels | 32,768 | Graphics |
| 117H | 1024x768 pixels | 65,536 | Graphics |
| 118H | 1024x768 pixels | 16,777,216 | Graphics |
| 119H | 1280x1024 pixels | 32,768 | Graphics |
| 11AH | 1280x1024 pixels | 65,536 | Graphics |
| 11BH | 1280x1024 pixels | 16,777,216 | Graphics |

Figure 6:
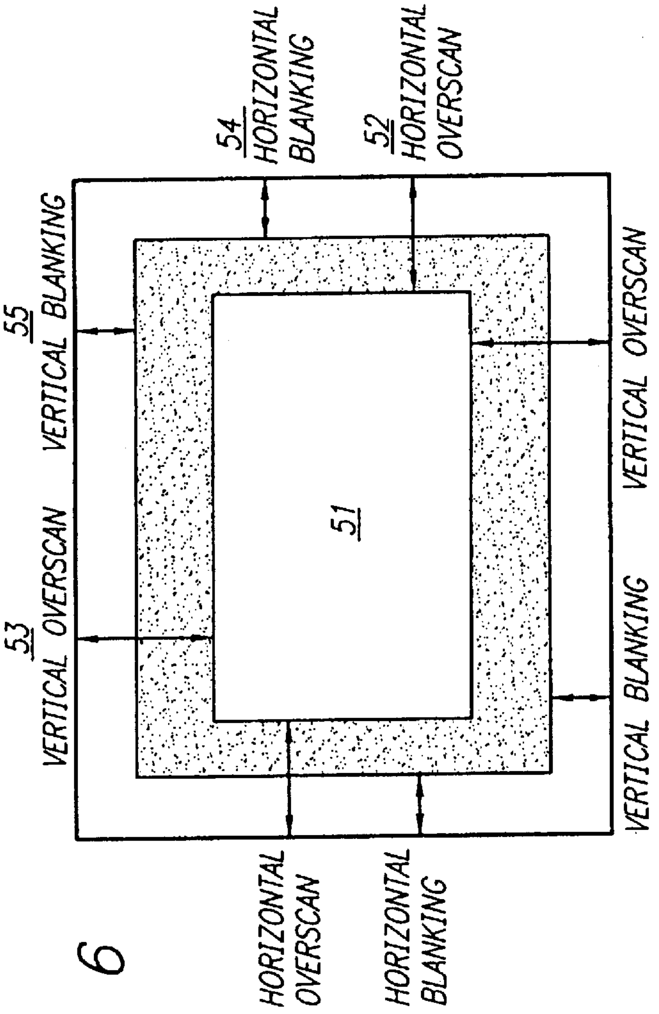
FIG. 6 is a diagram of the usable border within the vertical overscan and the horizontal overscan surrounding the standard display.

As shown in FIG. 6, a displayed image is "overscanned". That is, the displayed video buffer data occupies less than the entire drivable screen size. The drivable screen size is determined by the total amount of video memory and the operative video display characteristics. The width of the usable overscan border depends on the amount of the horizontal overscan 52 reduced by the horizontal blanking 54 and the amount of the vertical overscan 53 reduced by the vertical blanking 55.

In a first preferred embodiment, only a border at the bottom of the standard display area is used. Consequently, only the vertical control parameters for the cathode ray tube (CRT) controller, shown as Control Registers 6H, 16H, 11H, 10H, 12H and 15H in FIG. 4 need to be adjusted. These parameters and others are shown in Table 3 below:

TABLE 3

Vertical timing parameters for CR programming.

| Register | Name | Description |
|---|---|---|
| 6H | Vertical Total | Value = total number of scan lines per frame - 2<br>The high-order bits of this value are stored in the overflow registers. |
| 7H | Overflow | High order bits from other CR registers. |
| 10H | Vertical Retrace Start | Scan line at which vertical retrace starts.<br>The high-order bits of this value are stored in the overflow registers. |
| 11H | Vertical Retrace End | Only the low order 4 bits of the actual Vertical Retrace End value are stored.<br>(Bit 7 is set to 1 to write-protect registers 0 through 7.) |
| 12H | Vertical Display End | Scan line at which display on the screen ends.<br>The high-order bits of this value are stored in the overflow registers. |
| 15H | Start Vertical Blank | Scan line at which vertical blanking starts.<br>The high order bits of this value are stored in the overflow registers. |
| 16H | End Vertical Blank | Scan line at which vertical blanking ends.<br>The high order bits of this value are stored in the overflow registers. |
| 59H-5AH | Linear Address Window Position | Linear address window position in 32-bit CPU address space. |

In the standard 640×480 graphics mode, the nominal horizontal scan rate is 31.5 KHz (31,500 times per second) with a vertical scan rate of 60 Hz (60 frames per second). So the number of lines in one frame is 31,500/60, or 525. Because only 480 lines of data need to be displayed, there are 525–480, or 45, lines available for vertical overscan. Leaving a more than adequate margin for retrace, which requires only 2 lines worth of time, the preferred embodiment uses 20 lines for the alternate display. Thus the additional 23 unused but available lines may be used to increase the size of the operating system desktop to some non-standard size while still allowing two lines for retrace, or may be left blank, or may be used for one or more additional alternate parallel user interface displays.

The disclosed method of the preferred embodiment of the present invention is accomplished by achieving three requirements:

(1) to address and modify the visible resolution of the video display system such that portions of the overscan area are visible as shown in FIG. 6, (2) to address and modify the video display contents for the visible portion of the overscan area, and (3) to provide an application programming interface (API) or other mechanism to allow applications to implement this functionality.

Figure 7:
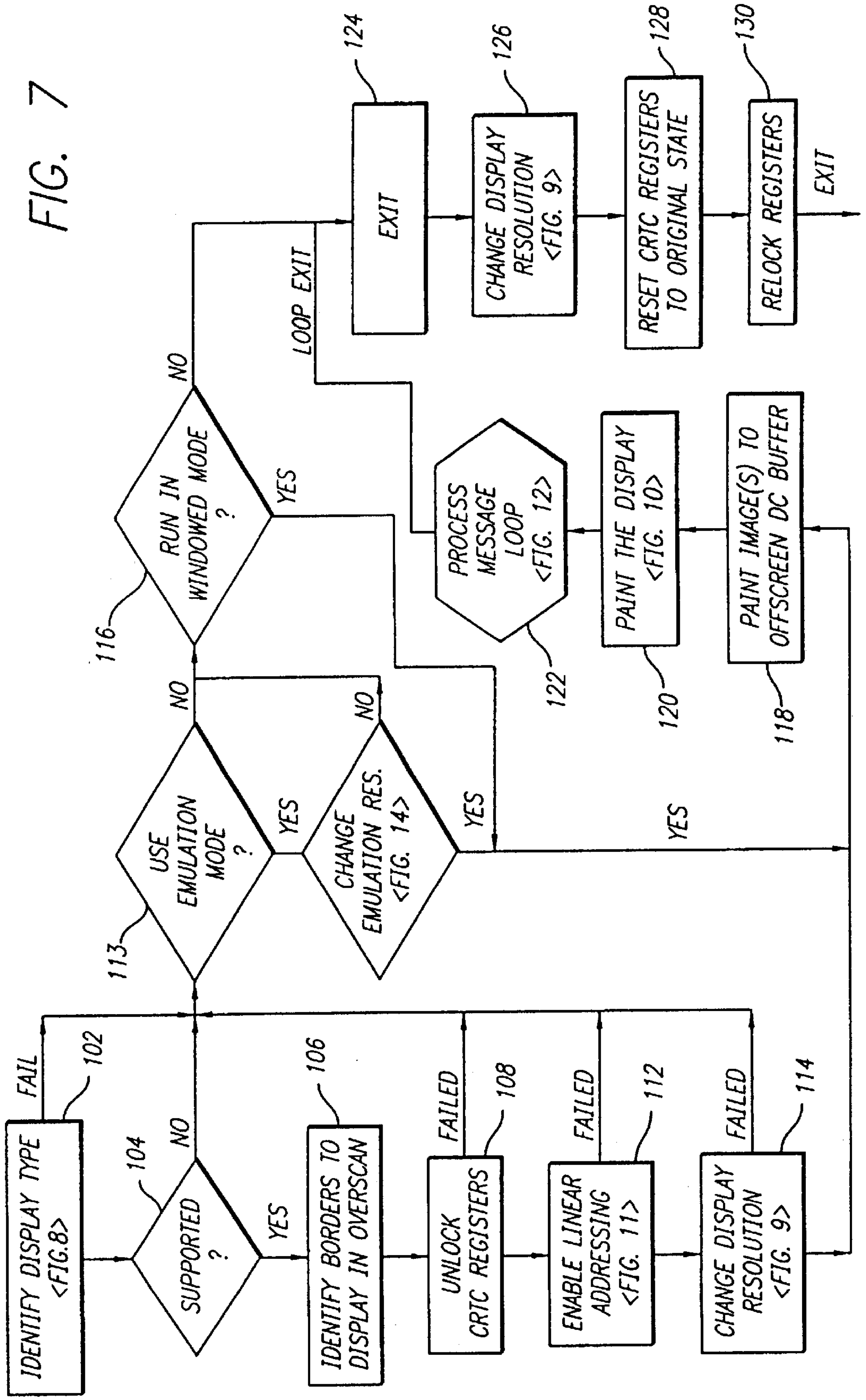
FIG. 7 is an overview flow chart showing the operation of a preferred embodiment of the present invention.

FIG. 7, and the additional details and sub-steps provided in FIGS. 8–13, provides a flow chart of an implementation of a preferred embodiment of the present invention meeting the requirements described above. The environment of this implementation is a standard Microsoft Windows 95™ operating environment, using Microsoft Visual C and Microsoft MASM for the development platform. That is not to imply that this invention is limited in scope to that environment or platform. The invention could be implemented within any graphical interface environment, such as X-Windows, OSF Motif, Apple OS, a Java OS, and others in which similar video standards (VGA, SVGA, XGA, 8514/A) are practiced. The reference books PC Video Systems by Richard Wilton, published by Microsoft Press and Programmer's Guide to the EGA, VGA, and Super VGA Cards by Richard F. Ferrano, published by Addison Wesley provide more than adequate background information to implement this embodiment.

Referring now in particular to FIG. 7, upon initialization, at Identify Display Type step 102, the program attempts to determine the display type, and current location in memory used by the display driver, in order to determine the size and locations of any display modifications to be made, .e.g. to the size and location of overscan area(s) to be used.

Figure 8:
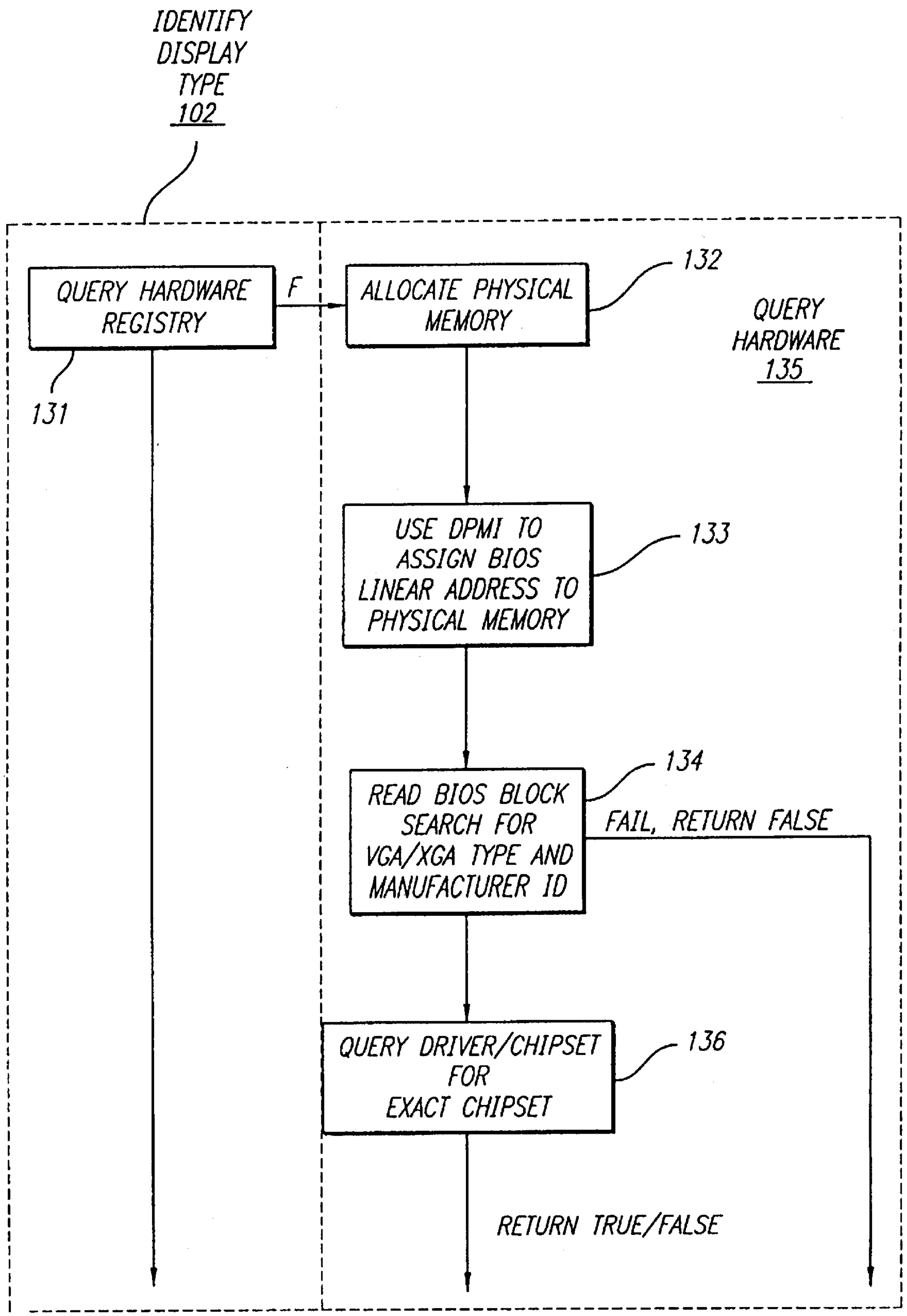
FIG. 8 is a flowchart of the sub-steps in Identify Display step 102 of FIG. 7.

As described in further detail in FIG. 8, the program first queries the hardware registry in Query. Hardware Registry, step 131, to attempt to determine the registered display type. If successful, the program then determines compatibility information in Display Type Supported, step 135, to verify that the program supports that display type and determine memory allocation information.

If the hardware registry information is unavailable, as determined in step 131, or the display type determined in step 131 is unsupported as determined by step 104, the program may use an alternate approach, shown as subroutine Query hardware, steps 135 in FIG. 8, to query the BIOS, in step 134, and the video chipset 66, in step 136, for similar information as; described immediately below.

If the BIOS is to be accessed in step 134, physical memory is first allocated in Allocate Physical Memory, step 132, and accessed using Microsoft's DPMI (DOS Protected Mode Interface) to map it to the linear memory address in which the BIOS resides in Use DPMI to assign BIOS linear address to physical memory, step 133.

Thereafter, the program queries the BIOS in Read BIOS block, Search for VGA/XVA type and manufacturer ID, step 134. If successful, the driver and chipset are then further queried to determine the display type and memory location in Query driver/chipset for exact chipset, step 136.

If the compatibility information does not indicate a standard VGA, SVGA, XGA, or 8514/A signature, step 134, this routine returns a failure. If a known chipset manufacturer's identification is found, the driver and/or chipset may be queried with manufacturer-specific routines, step 136, to identify and initialize, as necessary, the specific chipset.

If, at step 104, the program was unable to finally unable to identify the display type, either because the registry query in step 131 or the hardware query in step 135 was unsuccessful, the user may be prompted at Run in windowed mode, step 116, as to whether the program should continue to run as a standard "application bar" or "toolbar". The program may either exit or proceed to run as a toolbar on the desktop.

Returning now to FIG. 8, if a supported display type is detected, the program then determines the screen borders to be accessed in identify borders to display in overscan, step 106, based upon user preferences, and determines, as necessary, whether sufficient video memory exists to make the necessary display changes. For example, if the screen is currently set to a 1024×768 resolution at 16 bits-per-pixel, and the program is to include four graphical interface bars, one on each edge, with each bar 20 pixels deep, the program must check that video memory is greater than 1.7 MB (required number of bytes=Pixels Width*BitsPerPixel*PixelsHeight).

The controller registers 6H, 16H, 11H, 10H, 12H and 15H as shown in FIG. 4 and detailed in Table 3, may be accessed through standard input/output ports, using standard inp/outp functions. The CR registers 6H, 16H, 11H, 10H, 12H and 15H must first be unlocked, as indicated in Unlock CRTC registers, step 108 in FIG. 7, to make them writeable. They are unlocked by clearing bit 7 in controller register 11H.

Addressing of video memory, step 112, is accomplished through one of several means. One is to use the standard VGA 64 Kb "hardware window", moving it along the video memory buffer 67 (FIG. 4) in 64 Kb increments as necessary. The preferred method is to enable linear addressing by querying the video chipset for the linear window position address, step 138 of FIG. 11. This 32-bit offset in memory allows the program to map the linear memory to a physical address, steps 140 and 142 of FIG. 11, that can be manipulated programmatically.

Figure 9:
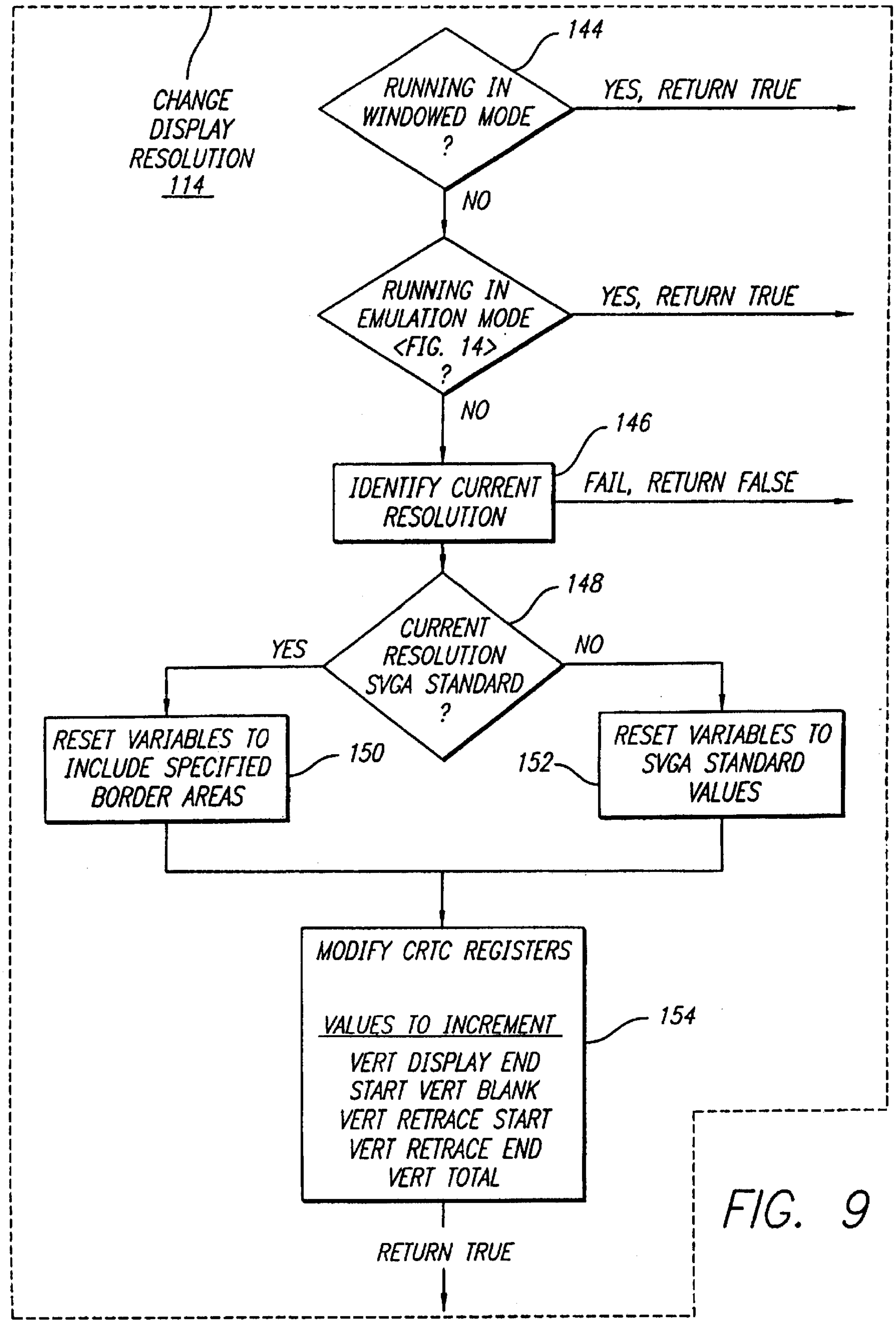
FIG. 9 is a flowchart of the sub-steps of changing the display resolution step 114 of FIG. 7.

At this point the program can modify the size of the display, step 114 and FIG. 9, to include the border areas. This routine first checks to determine whether or hot the system is running in "toolbar" mode, step 144, and, if so, returns true. If not, it then determines whether to reset all registers and values to their original state, effectively returning the display to its original appearance, step 152. The determination is based upon a number of parameters, such as whether the current resolution, step 146, reflects a standard value or previous programmatic manipulation, step 148. If a standard resolution is already set, the variables are reset to include the specified border areas, step 150. The CR registers are adjusted, step 154, to modify the scanned and blanked areas of the display. If the top or side areas are modified existing video memory is moved accordingly in step 162 of FIG. 10.

If any of the foregoing routines returns a failure, the program may prompt the user to determine whether "emulation" mode, step 13, or windowed mode step 116 should be used or if the program should exit at step 124.

In its simplest form, the invention can be treated as a technique for adding a secondary GUI by reconfiguring the actual display mode to add a modified, non-standard GUI mode in which the standard display size or resolution has been adjusted to include a secondary display in addition to the primary display. For example, a standard 640×480 display is modified in accordance with the present invention to become a larger display, one section of which corresponds to the original 640×480 display while another section corresponds to a 640×25 secondary GUI display.

There are various techniques or mechanisms required for modifying the system to include the secondary GUI, depending upon the requirements of the secondary GUI and upon the present circumstances of the unmodified system.

In another embodiment of the present invention system resources are allocated for a secondary GUI by fooling the video driver into going to larger resolution. This technique automatically guarantees that enough space is kept clean, since the video driver allocates system resources according to the resolution that the video driver believes it will be operating in. To operate one or more secondary user interfaces in one or more areas of the screen it is necessary to have the memory that was associated in video memory or in the frame buffer with that location, contiguously below the primary surface free and available. By writing a series of small applets specific to hardware known to have system resource allocation problems for a secondary user interface, the secondary user interface application may run such applet whenever resolutions will be switched, initializing the chip set pertinent to that particular applet. If the application finds an applet pertinent to the current particular chip set it will be launched. The applet or minidriver initializes itself, performs the necessary changes to the driver's video resolution tables, forces a reenable, and sufficient space is subsequently available for one or more secondary user interfaces.

When reenabled, the driver allocates video memory as needed for the primary display according to the data on the UCCO resolution tables. Therefore, the modified values result in a larger allocation. Once the driver has allocated memory necessary for the primary surface, the driver will allow no outside access to the allocated memory. Thus by fooling the driver into believing that it needs to allocate sufficient memory for a resolution exactly x bytes larger than the current resolution where x is the size of one or more secondary user interfaces, the application can be sure that no internal or external use of the allocated memory location can conflict with the secondary user interface.

This method ensures that system resources will be allocated for one or more secondary user interfaces by writing an applet that would address the video driver in such a way as to force the video driver, on its next reenable, to allocate video memory sufficient for a resolution higher than the actual operating system resolution. This may also be done by modifying each instance of the advertised mode tables, and thus creating a screen size larger than the primary user interface screen size.

This technique has an additional benefit of eliminating the need to prevent the driver from actually shifting into the specified larger resolution, handing the primary user interface a larger display surface resolution. The "hardware mode table," a variant of the aforementioned video resolution tables, is not advertised and not accessible. Therefore, when the driver validates the new resolution, checking against the hardware mode table, it will always fail and therefore refuse to shift into that resolution. Because this technique modified the advertised video resolution tables early enough in the driver's process, allocated memory was modified, and memory addresses set before the failure in validate mode. Subsequently when the CRTCs are modified, in step 114, the driver is reserving sufficient memory for one or more secondary user interfaces and not making it available for any other process or purpose.

In yet another embodiment of the present invention, an enveloping driver is installed to sit above the existing driver and shims itself in between the hardware abstraction layer and the actual video driver in order to be able to handle all calls to the video driver and modify the driver and the driver's tables in a much more generic fashion rather than in a chipset specific fashion. The enveloping driver shims into the primary video driver, transparently passing calls back and forth to the primary video driver. The enveloping driver finds the video resolution tables in the primary video driver which may be in a number of locations within the driver. The enveloping driver modifies the tables (for example, increasing 800 by 600 to 800 by 620). A 1024 by 768 table entry may become 1024 by 800.

Like the previously described embodiment, the primary driver cannot validate the new resolution and therefore cannot actually change the display setting. As a result, the driver allocated memory, allocated the cache space, determined memory address and moved cache and off screen buffers as necessary. So the primary driver never uses all the space allocated, and will never draw in that space.

As stated earlier, the method of the present invention may include three primary steps, finding or producing unused video memory, creating or expanding the overscan area, and putting data in the overscan area.

The step of finding or producing the unused video memory requires a review of the contents of the Controller Registers, the CR registers, used by VGA compatible chip sets or graphic boards to identify where the overscan area, the blanking, the vertical and horizontal total and the sinking should be set. The CR defines the desktop display, how its synched, where it's laid out left and right, how much buffer area there would be on each side, where it would be stored within the video memory area. A review of the contents of the CR data registers therefore fully defines and allows one to control the potential location and size of the overscan area.

In order to accomplish the step of creating or expanding the overscan area the CRs may currently be used directly for systems with video display resolutions up to and including 1024 pixels in any dimension, that is, resolutions which can be defined in the generally accepted VGA standards by 10 bits per register. To expand the overscan area, new data is written into the CR using standard techniques such as the Inp and Outp, functions. A standard video port and MMIO functions may also be used to modify the CRs.

At greater resolutions, 11 bits may be needed to properly define the resolution. There is currently no standard way in which the $11^{th}$ bit location is defined. Therefore, at a resolution above 1280 by 1024, for example, an understanding about the video card itself, particularly how the 11 bits representing the resolution are stored, is currently required and will be described below in greater detail.

When expanding the overscan, it is important to make sure a previous overscan bar is not already displayed, possibly from a previous crash or other unexpected problem. Either the display must be immediately reset to the appropriate resolution defaults, or the CR queried to determine if the total screen resolution as understood by the video card and drivers differs from the screen resolution known by the operating system display interface. An overscan bar may already be displayed if the total screen resolution is not equal to one of the standard VGA or SVGA resolutions. In particular, if the total screen resolution is equal to a standard VGA/SVGA resolution plus the area required for the overscan bar or is greater than the resolution reported by the operating system display interface, the display is reset.

Once the display area or resolution as stored in the CR is determined, the resolution or display area can be extended in several different ways. The overscan area can be added to the bottom, the top, or the right of the current display area, and optionally, the display area can be repositioned so that the overscan bar can remain centered in appearance. Alternatively the overscan area can be added anywhere and the original or desktop display area can be centered to improve appearance. In any event, the height/width of the display area required for the overscan bar is presented adjacent the desktop area stored in the CR and the combination is written into the CR, overwriting the previous data.

The screen typically shows a quick flash as it is placed in a different mode, including the desktop display area as well as a parallel GUI such as a display bar in the overscan area. As soon as that change occurs, a black mask can be positioned over the new areas. The new menu data can then be safely written on top of the black mask so that the user never sees memory "garbage".

There is typically a few seconds of load time during which a simple message can be displayed, such as "Loading . . . ", to avoid confusing the user.

There are a number of mechanisms by which this may be done. A set of class objects is used, all derived from a common base class corresponding to the above described VGA-generic technique.

The first mechanism is an implementation of the VGA-generic technique. Using this mechanism, no information specific to a video-card is necessary, other than ensuring VGA support. Using standard application programming interface (API) routines, primary and secondary surfaces are allocated. The new display data in the CR is simply the physical address at the start of the primary surface plus the number of pixels defined by the screen size.

Allocation of the primary surface will always be based on the entire screen display. Given the linear address of the allocated primary surface, from which a physical address can be derived, it can be extrapolated that the physical address of the location in video memory immediately adjacent to the primary surface is represented by the sum of the number of bytes of memory used to maintain the primary surface in memory plus the value of the physical address of the primary surface.

Once the physical address of the primary surface is known, the size of the primary surface as represented in video memory can be determined.

For example, the system looks in the CRs for the resolution of the screen, 800 by 600, in terms of number of bits per pixel, or bytes per pixel. Then any data stored in the CR representing any horizontal synching space is added. This is the true scan line length. The scan line length is a more accurate measurement of the width in a given resolution.

Next, the physical address of the allocated secondary surface is derived from its linear address. In the case where the allocated secondary surface is, in fact, allocated in the memory space contiguous to the primary surface (the value of the secondary surface physical address is equal to the value of the primary surface physical address plus the size of the primary), the secondary surface is determined to be the location in memory for the overscan display.

If, however, the above is not true and the secondary surface is not contiguous to the primary surface, another approach mechanism is required.

To summarize, the first mechanism determines how much physical area to allocate for the desktop allowing adjacent area for parallel GUI secondary space beyond that to display in the overscan area. The newly allocated area will be the very first block of memory available. If this block immediately follows the primary surface, the physical address will correspond to the value associated with the physical address of the primary surface, plus the size of the primary surface. If that is true, the memory blocks are contiguous, this VGA-generic mechanism can be used.

If this first, VGA-generic mechanism cannot be used, the video card and driver name and version information retrieved from the hardware registry and BIOS, as described earlier, is used in conjunction with a look-up-table to determine the best alternatives among the remaining mechanisms. The table includes a set of standards keyed to the list of driver names found in the hardware registry. A class object specific to the video chipset is instantiated based, directly or indirectly, on the VGA-generic object.

If the hardware look up does not result in a reliable match, a reliability, or confidence, fudge factor may be used. For example, if the hardware look up determines that an XYZ-brand device of some kind is being used, but the particular XYZ device named is not found in the look up table, a generic model from that chipset manufacturer many often be usable. If no information is available, the user may get a message indicating that the hardware is not supported and that the program cannot run in the overscan area. The user may then be queried to determine if the system should be operated in the "application-toolbar" mode, which basically runs with exactly the same functionality but in a windowed environment within the desktop rather than in the overscan area outside the desktop.

The next alternative mechanism uses surface overlays. The first step to this approach is to determine if the system will support surface overlays. A call is made to the video driver to determine what features are supported and what other factors are required. If surface overlays are supported, for example, there may be a scaling factor required.

For example, a particular video card in a given machine, using 2 megabytes of video RAM, might support unscaled surface overlays at 1024×768 at 8 bits per pixel, but not at 1024×768 at 16 bits per-pixel because the bandwidth of the video card or the speed of the card, coupled with the relatively small amount of video memory would not be sufficient to draw a full width overlay. It is often horizontal scaling that is at issue, preventing the driver from drawing a full width overlay. An overlay is literally an image that is drawn on top of the primary surface. It is not a secondary surface, which is described above. Typically, the system sends its signal from the video driver to the hardware such that it merges the two signals together, overlaying a second signal on top of the first.

If a system can not support unscaled overlays, perhaps because of bandwidth issues or memory issues, this mechanism is not desirable. It is not rejected, but becomes a lower priority alternative. For example, if the scaling factor is below 0.1, then the normal bar can be drawn and it will be clipped closer to the edge. If the scaling factor is more than 10%, another approach mechanism is required In the next set of alternative mechanisms, a secondary surface is allocated sufficient in size to encompass the normal desktop display area plus the overscan area to be used for display of the overscan bar or bars. Using these mechanisms, the allocated secondary surface does not have to be located contiguous in memory to the primary surface. However, these approaches use more video memory than the others.

The first step is to allocate a secondary surface sufficient in size to contain the video display (the primary surface) plus the overscan area to be used. If the allocation fails, that means that there is not enough video memory to accomplish the task and this set of mechanisms is skipped and the next alternative tried. After the new block of memory is allocated, a timer of very small granularity is used to execute a simple memory copy of in the contents of the primary surface onto the appropriate location of this secondary surface. The timer executes the copy at approximately 85 times per second.

Within this set of alternative mechanisms is a variant that uses the system page tables. This mechanism queries the system page tables to determine the current GDI surface address, that is, the physical address in the page table for the primary surface. A secondary surface is then created large enough to hold all of what is in the video memory plus the memory required for the overscan bar to be displayed. This surface address is then pushed into the system page table and asserted as the GDI surface address.

Thereafter, when GDI reads from or writes to the primary surface through the driver, it actually reads from or, writes the new, larger surface. The overscan bar program can, subsequently, modify the area of the surface not addressed by GDI. The original primary surface can be de-allocated and the memory usage reclaimed. This mechanism, being more memory-efficient than the previously described mechanism, is the preferred alternative. But the page tables solution will not work correctly on a chipset that includes a coprocessor device. If the initial device query reveals that the device does include a coprocessor, this variant mechanism will not be attempted.

Other variations of the above-described mechanisms are accounted for in derived class objects. For example, the VGA-generic mechanisms may vary when the video card requires more than ten bits to represent the video resolution in the CR. Some instances may require 11 bits. Such registers typically do not use contiguous bytes, but use extension bits to designate the address information for the higher order bits.

In this example, the eleventh bit is usually specified in an extended CR register and the extended CR registers are usually chip specific.

Similarly, a variation of the surface overlay mechanism includes a scaling factor, as described above. This alternative is handled in specific implementations through derived class objects and may be the best solution in certain situations.

Figure 14:
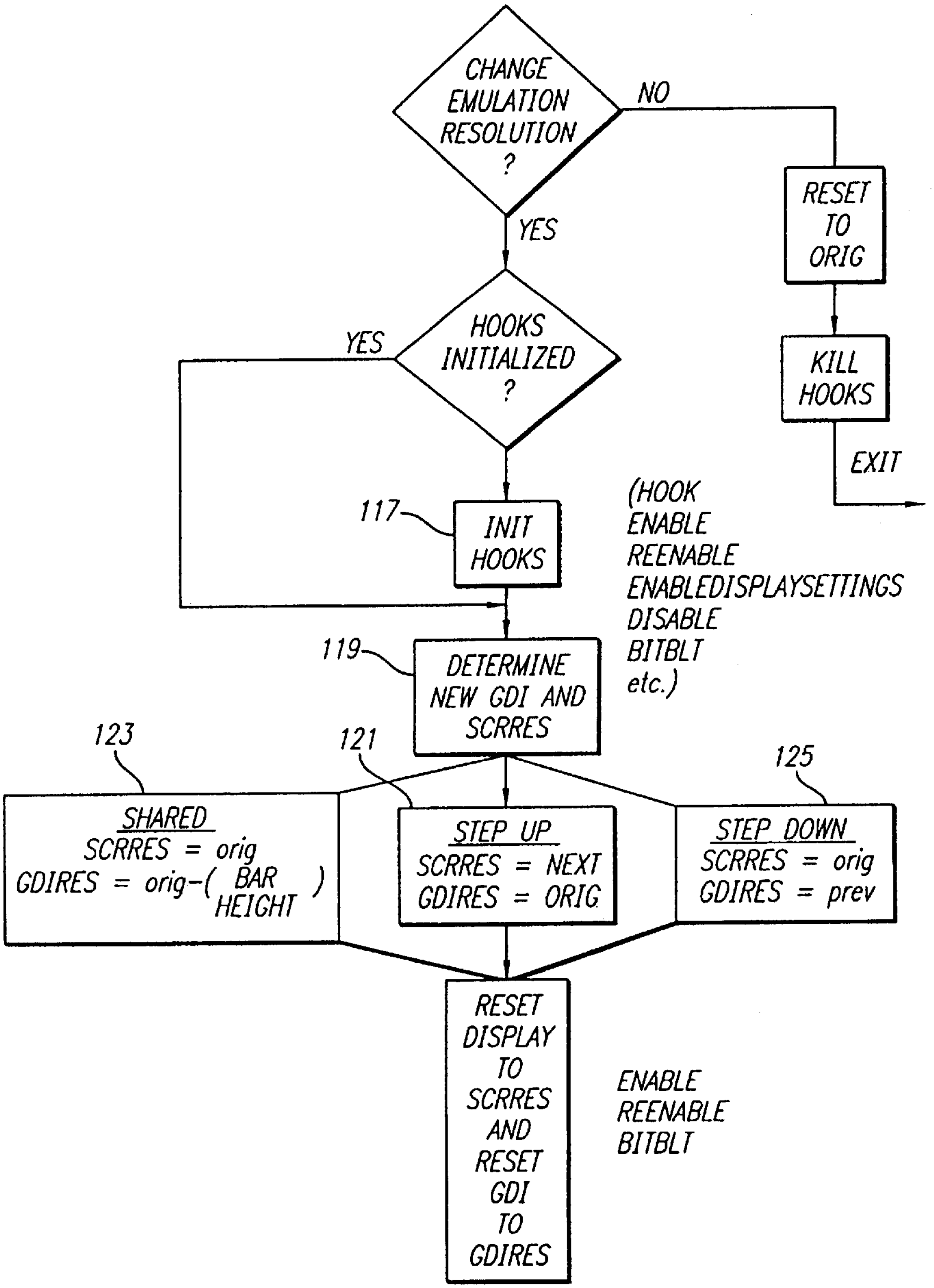
FIG. 14 is a flowchart of the sub-steps of the Change Emulation Resolution step 115 in FIG. 7.

Another implementation of this technology uses a "hooking" mechanism as shown in FIG. 14. After the display driver is identified through the hardware registry or the BIOS, as described above, certain programming interface entry points into the driver are hooked such as at step 117. In other words, when the video system device interface, Windows GDI for example, calls those entry points into the display driver, the program can take the opportunity to modify the parameters being passed to the display driver, and/or to modify the values being returned from the display driver.

By hooking the "ReEnable" function in the display driver, at step 117, the overscan bar program can allocate screen area in different ways in step 119:

(1) In step-up mode, step 121, by intercepting a resolution change request and identifying the next-higher supported screen resolution and passing that higher resolution to the display driver, then, when the display driver acknowledges the change, intercepting the returned value, which would reflect the new resolution, and actually returning the original requested resolution instead. For example, GDI requests a change from 640×480 resolution to 800×600 resolution; the overscan program intercepts the request and modifies it to change the display driver to the next supported resolution higher than 800×600, say 1024×768. The display driver will change the screen resolution to 1024×768 and return that new resolution. The overscan program intercepts the return and instead passes the original request, 800×600, to GDI. The display driver has allocated and displays a 1024×768 area of memory. GDI and Windows will display the desktop in an 800×600 area of that display, leaving areas on the right and bottom edges of the screen available to the overscan program.

(2) In shared mode, step 123, by intercepting only the return from the display driver and modifying the value to change the operating system's understanding of the actual screen resolution. For example, GDI requests a change from 800×600 resolution to 1024×768 resolution. The overscan program intercepts the returned acknowledgment, subtracting 32 before passing the return on to GDI. The display driver has allocated and displays a 1024×768 area of memory. GDI and Windows will display the desktop in an 1024×736 area of that display, leaving an area on the bottom edge of the screen available to the overscan bar program.

After hooking, the overscan bar program can display by:

(1) using standard API calls to render the bar to an off-screen buffer, as described in the next section, and then hooking the "BitBlt" function entry point into the display driver in order to modify the offset and size parameters and subsequently redirect the BitBlt to the area outside of that which the API believes is onscreen.

(2) using mechanisms of primary and secondary surface addresses, described earlier, the program determines the linear addresses for the off-desktop memory location(s) left available to it, and can render directly to those memory locations.

Figure 10:
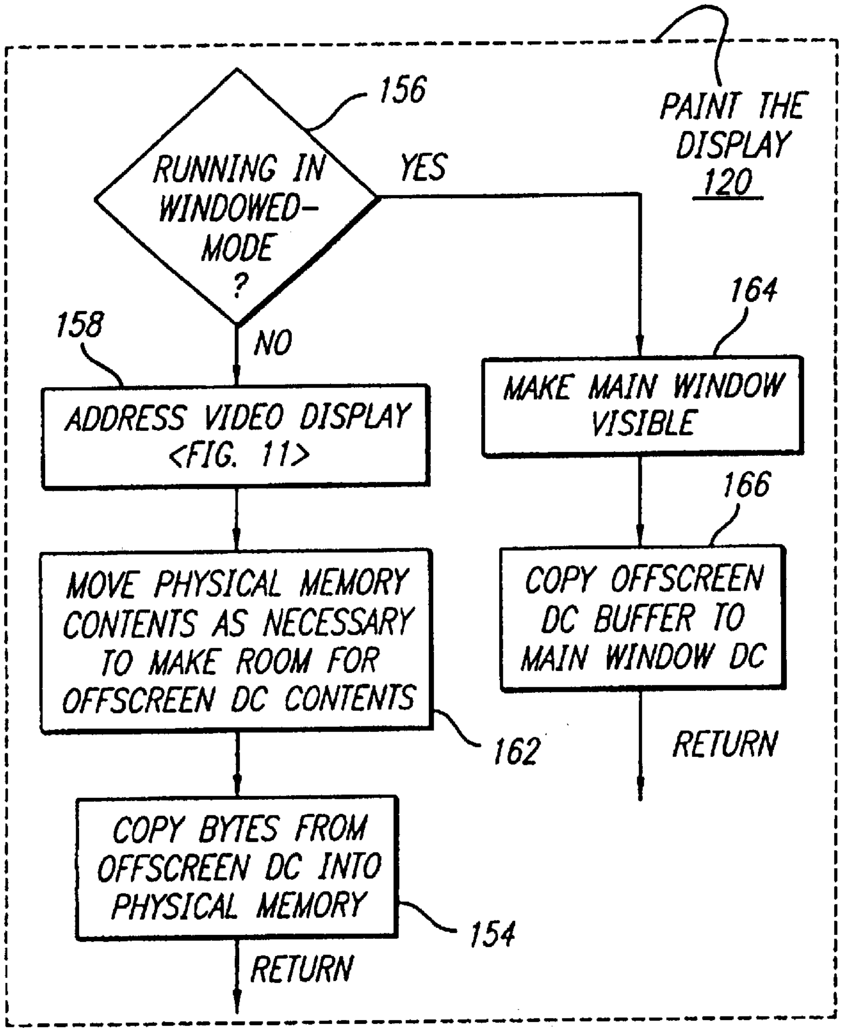
FIG. 10 is a flowchart of the sub-steps in the Paint the Display step 120 of FIG. 7.
Figure 11:
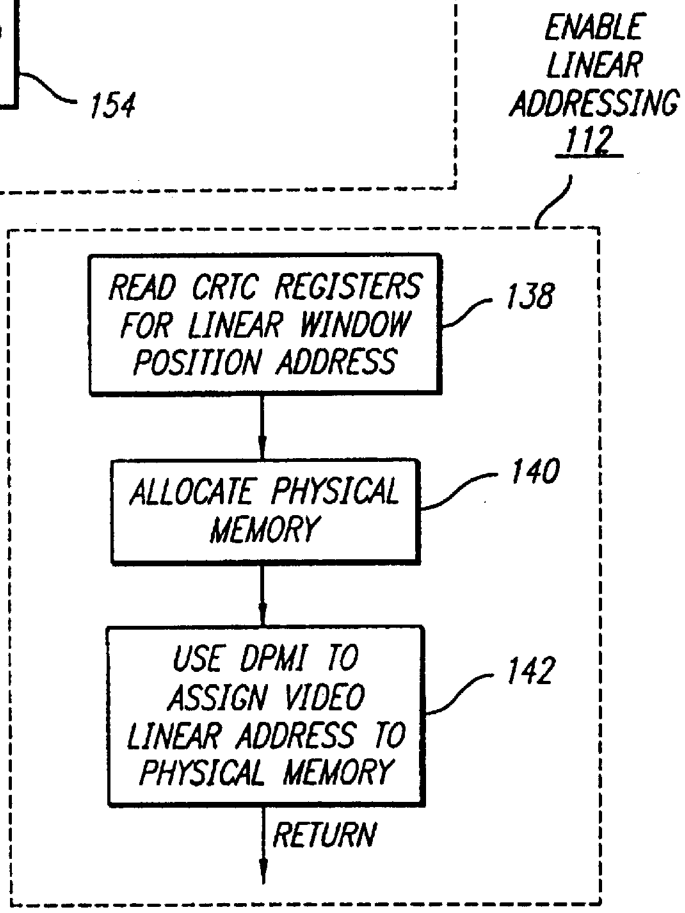
FIG. 11 is a flowchart of the sub-steps of Enable Linear Addressing step 112 of FIG. 7.
Figure 12:
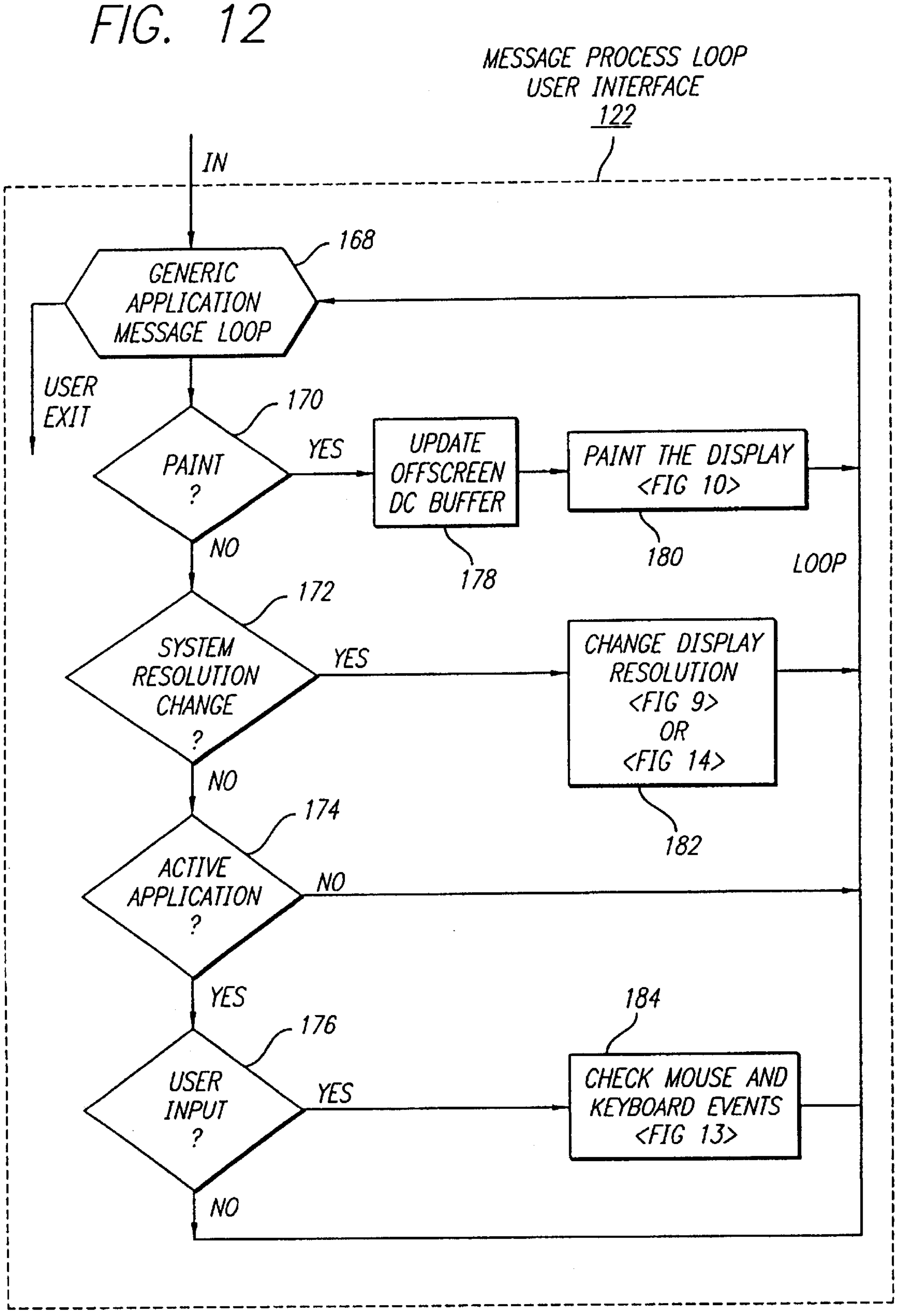
FIG. 12 is a flowchart of the sub-steps of the Process Message Loop of FIG. 7.

Phase 2 of the invention begins by painting the new images into a standard off-screen buffer, step 118, as is commonly used in the art, and making the contents visible, step 120, as described in FIG. 10. If the program is in "toolbar" mode, step 156, the off-screen buffer is painted into the standard window client space, step 166, and made visible, step 164, using generic windowing-system routines. Otherwise, the linear window position address is mapped, step 158, as described in FIG. 11 which has been previously explained. Once the linear memory is mapped to a physical memory address, step 142, the contents of the off-screen display buffer can be copied into the video buffer directly, step 154 of FIG. 10, or painted as to a secondary surface.

The preferred embodiment application includes a standard application message loop, step 122, which processes system and user events. An example of a minimum functionality process loop is in FIG. 12. Here the application handles a minimal set of system events, such as painting requests, step 170, system resolution changes, step 172, and activation/deactivation, step 174. Here, too, is where user events, such as key or mouse events, may be handled, step 184, detailed in FIG. 13. System paint messages are handled by painting as appropriate into the off-screen buffer, step 178, and painting the window or display buffer, step 180, as appropriate, as described earlier in FIG. 10. System resolution messages are received whenever the system or user changes the screen or color resolution. The programs reset all registers to the correct new values, then change the display resolution, step 182, as earlier described in FIG. 9, to reflect the new resolution modified. User messages are ignored when the program is not the active application.

Figure 13:
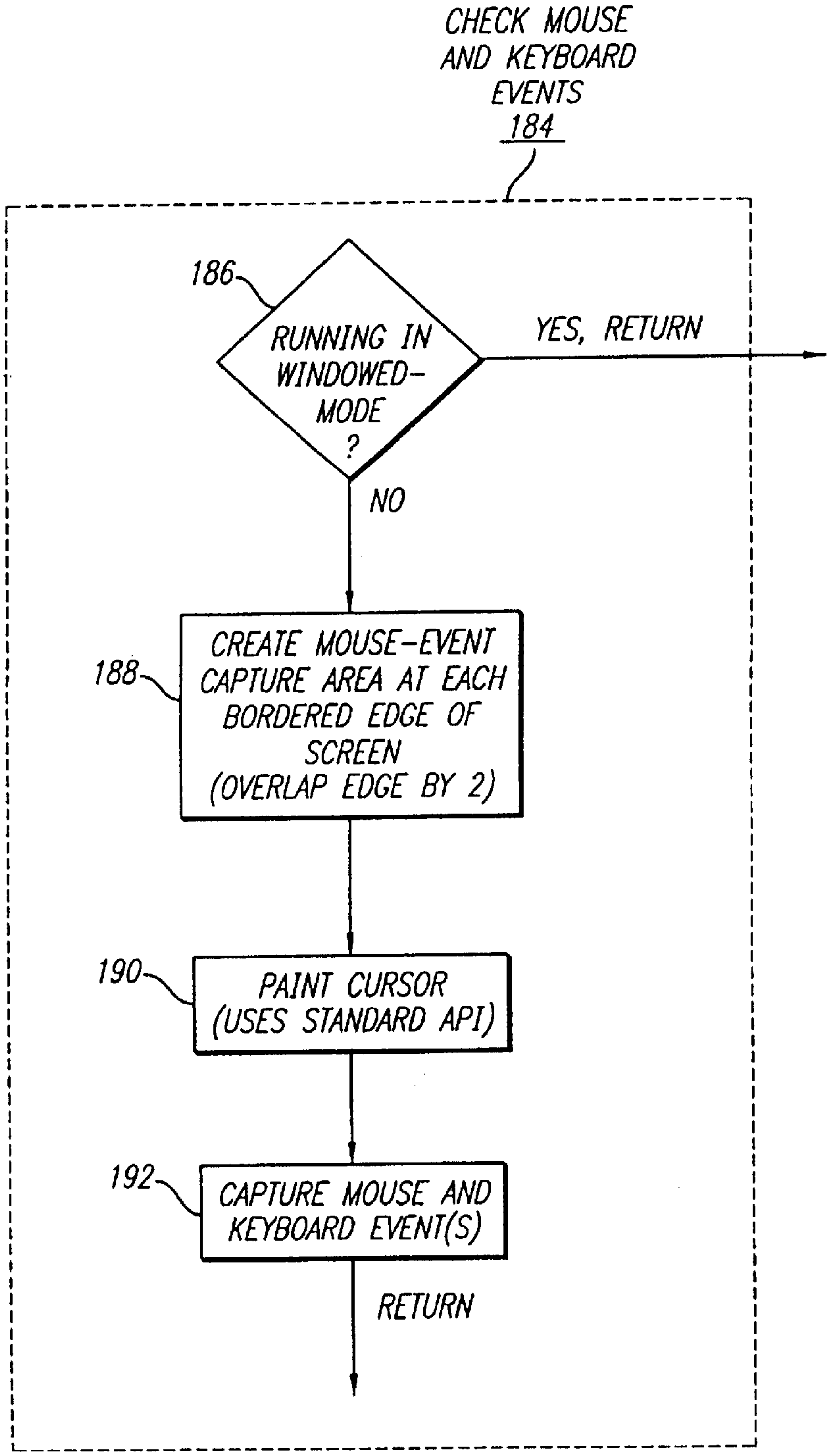
FIG. 13 is a flowchart of the sub-steps of the Check Mouse and Keyboard Events step 184 in FIG. 12.

FIG. 13 describes a method of implementing user-input events. In this embodiment, there are three alternative mechanisms used to implement cursor or mouse support so that the user has a pointing device input tool within the overscan area user interface.

In the preferred mechanism, GDI's "cliprect" is modified to encompass the overscan bar's display area. That keeps the operating system from clipping the cursor as it moves into the overscan area. This change doesn't necessarily make the cursor visible or provide event feedback to the application, but is the first step.

Some current Windows applications continually reset the cliprect. It is a standard programming procedure to reset the cliprect after use or loss of input focus. Some applications use the cliprect to constrain the mouse to a specific area as may be required by the active application. Whenever the overscan display bar interface receives the input focus it reasserts the cliprect, making it large enough for the mouse to travel down into the overscan space.

Once the cliprect has been expanded, the mouse can generate messages to the operating system reflecting motion within the expansion area. GDI does not draw the cursor outside what it understands to be its resolution, however, and does not pass "out-of-bounds" event messages on to an application. The overscan program uses a VxD device driver, and related callback function, to make hardware driver calls at ring zero to monitor the actual physical deltas, or changes, in the mouse position and state. Every mouse position or state change is returned as an event to the program which can graphically represent the position within the menu display bar.

An alternative mechanism avoids the need to expand the cliprect in order to avoid conflict with a class of device drivers that use the cliprect to facilitate virtual display panning. Querying the mouse input device directly the overscan program can determine "delta's", changes in position and state. Whenever the cursor touches the very last row or column of pixels on the standard display, it is constrained there by setting the cliprect to a rectangle comprised of only that last row or column. A "virtual" cursor position is derived from the deltas available from the input device. The actual cursor is hidden and a virtual cursor representation is explicitly displayed at the virtual coordinates to provide accurate feedback to the user. If the virtual coordinates move back onto the desktop from the overscan area, the cliprect is cleared, the virtual representation removed, and the actual cursor restored onto the screen.

A third alternative mechanism creates a transparent window that overlaps the actual Windows desktop display area by a predefined number of pixels, for example, two or four pixels. If the mouse enters that small, transparent area, the program hides the cursor. A cursor image is then displayed within the overscan bar area, at the same X-coordinate but at a Y-coordinate correspondingly offset into the overscan area. If a two-pixel overlap area is used, this method uses a granularity of two. Accordingly, this API-only approach provides only limited vertical granularity. This alternative mechanism assures that all implementations will have some degree of mouse-input support, even when cliprect and input device driver solutions fail.

FIG. 7 describes the cleanup mechanisms executed when the program is closed, step 124. The display is reset to the original resolution, step 126, and the CR registers are reset to their original values, step 128, and locked, step 130.

In another embodiment of the present invention, the launching or initiating of alternate display content controller 6 may be modified and controlled. Alternate display content controller 6 may be launched as a service, as an application, or as a user application. As a service, alternate display content controller 6 may be launched as a service within the registry of utility operating system 5B. The first kind of application is launched in the Run section in the registry, and the user application may be initiated from the Start Up Group within the Start button. Thus, alternate display content controller 6 may be initiated any time from the first thing after graphics mode is enabled to the very last thing initiated.

Launched as a service, alternate display content controller 6 may be visible shortly after utility operating system 5B such as Windows actually addresses the display, and how soon after depends on where alternate display content controller 6 is put it in the order of the things that will be launched as services. It may be possible to put alternate display content controller 6 so that it launches as essentially the first service and thus would launch almost at the same time as the drivers, very, very shortly after the drivers are launched. Accordingly, it is possible to have the screen change from textmode to graphics, draw the colored background, immediately re-display with the overscan addressed and a parallel GUI such as CSNB 2 display the very close to the same time as taskbar. Launched as a run-line application, alternate display content controller 6 may be visible in display space 1 shortly after icons appear.

NetSpace

Referring again to FIG. 1, in an alternate embodiment of the present invention, the technique of controlling the allocation of display area 1 is used to open a context sensitive network browser 2 (CSNB) adjacent but not interfering with operating system desktop 3 and/or parallel graphical user interface 4. A display controller such as alternate display content controller 6 may include CSNB 2 thus permitting the browser to create and control a space for itself on display 1 which may not be overwritten by utility operating system 5B. The combined controller/browser may be an application running on the computer operating system, or may include an operating system kernel of varying complexity ranging from dependenton the utility operating system for hardware system services to a parallel system independent of the utility operating system and capable of supporting dedicated applications. The alternate display content controller/browser may also include content and operating software, such as JAVA delivered over the Internet I or any other LAN. There may also be more than one context sensitive network browser and more than one parallel graphical user interface in addition to the operating system desktop.

Context sensitive interface such as network browser 2 may respond to movement and placement of cursor IC controlled by a pointing device such as mouse 1M anywhere on display area 1. The generation and control of a cursor across two or more parallel graphical user interfaces was described previously.

The location of cursor 1C will trigger CSNB 2 to retrieve appropriate and related network pages such as web page 2A. CSNB 2 may store the last X number of CSNB enabled network addresses for display offline. In a currently preferred embodiment of the present invention, X is ten pages. If a user is examining a saved CSNB enabled page offline, a mouse click on the page or a link on the page will initiate the users dial-up sequence and establish an online connection.

In an alternate embodiment, alternate display content controller 6 may include a browser or search engine. In an alternate embodiment of the present invention, space 2C may include an edit input box 2D. Edit input box 2D may include conventional functionality's such as edit, copy, paste, etc. A user may enter a URL into edit input box 2D using any conventional input device and then select a button to launch or initiate alternate display content controller 6 as a browser. This may be accomplished by using objects and or drivers from utility operating system 5B. Initiating alternate display content controller 6 as a browser would include a simple window to display the URL as a live HTML document with all conventional functionality. By implementing alternate display content controller 6 as a little applet that uses that DLL, it may slide on, or slide off. Thus initiating alternate display content controller 6 as a browser is like a window into the Internet.

Secondly, a user may enter any text into edit input box 2D using any conventional input device and then select a button to launch or initiate alternate display content controller 6 as a search engine. By entering a search string and selecting "search" and enter any string and click on "search" and pass that to any number from one to whatever or existing search engines, and subsequently have the search string acted on by one or more selected search engines and or by alternate display content controller 6 as a search engine. Resulting in multiple different windows appearing in some sort of stacked or cascaded or tiled format, with the different searches within them.

Using alternate display content controller 6 as a search engine or browser, the results or HTML document may be displayed in any overscan area or on the desktop.

Figure 17:
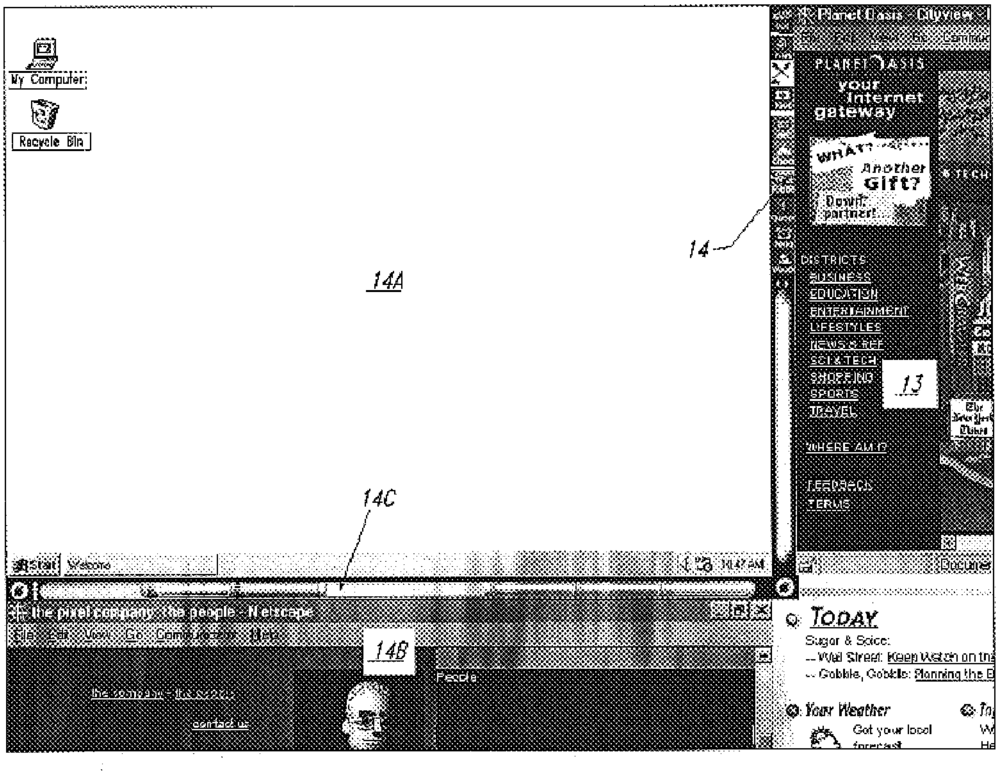
FIG. 17 is a diagram of a standard display including a desktop, an overscan user interface in the bottom overscan area and a context sensitive browser on the side.
Figure 18:
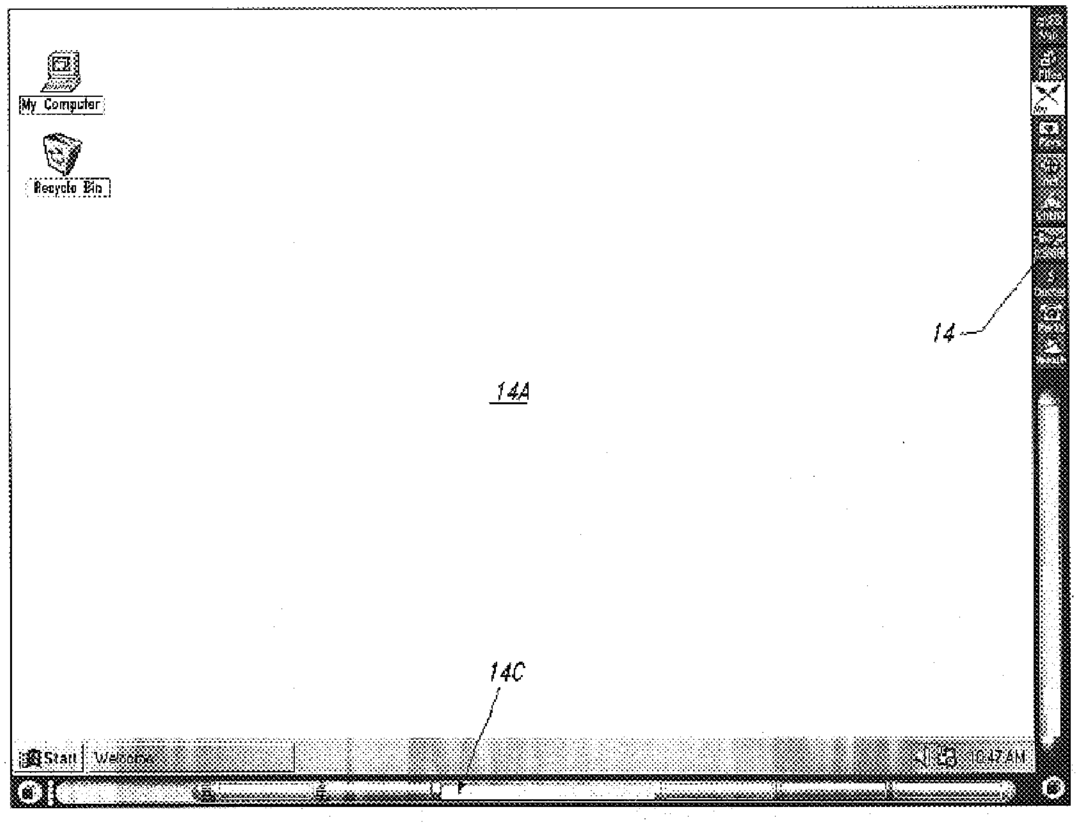
FIG. 18 is a diagram of a standard display with an overscan user interface in the bottom and on the right overscan area.

Referring now to FIG. 17, a context sensitive network browser such as CSNB 13 may also include a suite of tools such as tools 14 that may or may not have fixed locations on the browser space. Such tools may include but are not limited to e-mail, chat, buddy lists and voice. As shown, spaces such as desktop 14A, web page 14B, secondary GUI 14C and browser 13 may be arranged in any convenient manner.

Alternative Embodiments

Figure 5:
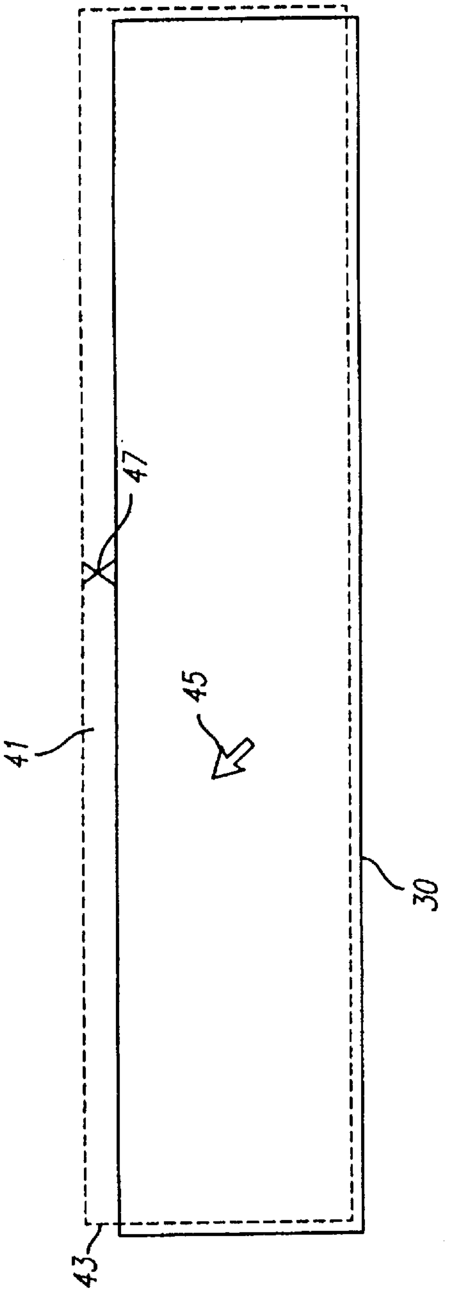
FIG. 5 is a diagram of a cursor or pointer within the overscan user interface and the hotspot above it within the standard display.

1. Utilizing the VESA BIOS Extensions (VBE) in place of the CRT Controller registers (FIG. 5) to determine the linear window position address, step 138, as necessary.
2. Utilizing API's (application programming interfaces) 62 capable of direct driver and/or hardware manipulation, such as Microsoft's DirectX and/or DirectDraw, in place of the CRT Controller registers and/or direct access to the display buffer.
3. Utilizing API's (applications programming interfaces) 62, such as Microsoft's DirectX and/or DirectDraw, capable of direct driver and/or hardware manipulation, to create a second virtual display surface on the primary display with the same purpose, to display a separate and unobscured graphical user interface.
4. Utilizing modifications in the video subsystem of the operating system 63 in place of the CRT Controller registers and/or DirectX access to the display buffer.
5. Utilizing modifications in the video subsystem of the operating system 63 to create a second virtual display surface on the primary display with the same purpose, to display a separate and unobscured graphical user interface.
6. Building this functionality into the actual video drivers 64 and/or mini-drivers. Microsoft Windows provides support for virtual device drivers, VxDs, which could also directly, interface with the hardware and drivers. These could also include an API to provide applications with an interface to the modified display.
7. Incorporating the same functionality, with or without the VGA registers, into the BIOS and providing an API to allow applications an interface to the modified display.
8. Incorporating the same functionality into hardware devices, such as monitor itself, with hardware and/or software interfaces to the CPU.
9. This technique may be used to control the desktop (i.e. Windows) to easily enable the desktop to operate in virtually any non-standard size limited only by the capability of the display hardware. This may be in combination with parallel graphical user interface displays or exclusively to maximize the primary operating system desktop display area. This may not require any modification to the operating system.

In overview, the visual display area is conventionally defined by the values maintained in the CRTC registers on the chip and available to the driver. The normally displayed area is defined by VGA standards, and subsequently by SVGA standards, to be a preset number of modes, each mode including a particular display resolution which specifies the area of the display in which the desktop can be displayed.

The desktop can only be displayed in this area because Windows does not directly read/write the video memory, rather it uses programming interface calls to the video driver. And the video driver simply reads/writes using an address that happens to be in video memory. So the value this mechanism needs to realize is the value the video card and driver assert is available for painting. This value is queried from the registers, modified by specific amounts and rewritten to the card. Subsequently, the present invention changes the area of writable visible display space without informing the operating system's display interface of the change This invention doesn't necessary change the CRTCs to add just to the bottom. Preferably the top is also moved up a little. This keeps the displayed interfaces centered within the drivable display area. For example, rather than just add thirty-two scan lines to the bottom, the top of the display area is moved up by sixteen lines.

Nor does this invention depend solely upon the ability to change the CRTCs to modify the visible display area. Alternative mechanisms define other methods of creating and accessing visible areas of the screen that are outside the dimensions of the desktop accessed by the operating system's display interface.

From a consideration of the specifications, drawings, and claims, other embodiments and variations of the invention will be apparent to one skilled in the art of computer science.

In particular, the secondary GUI may be positioned in areas not normally considered the conventional overscan area. For example, the secondary GUI may be positioned in a small square exactly in the center of the normal display in order to provide a service required by the particular system and application. In fact, the techniques of reading and rewriting screen display information can be used within the scope of the invention to maintain the primary GUI information, or portions of it, in an additional memory and selectively on a timed, computed, interactive, or any or other basis, replace a portion of the primary GUI with the secondary GUI such as a pop-up, window, or any other display space.

As a simple example, a security system may require the ability to display information to a user without regard to the status of the computer system and/or require the user to make a selection, such as call for help by clicking on "911?". The present invention could provide a video display buffer in which a portion of the primary GUI interface was continuously recorded and displayed in a secondary GUI for example in the center of the screen. Under non-emergency conditions, the secondary GUI would then be effectively invisible in that the User would not notice anything except the primary GUI.

Under the appropriate emergency conditions, an alarm monitor could cause the secondary GUI to present the "911?" to the user by overwriting the copy of the primary display stored in the secondary GUI memory. Alternatively, a database of photographs may be stored and one recalled in response to an incoming phone call in which caller ID identified a phone number associated with a database photo entry.

In general, the present invention may provide one or more secondary user interfaces which may be useful whenever it is more convenient or desirable to control a portion of the total display, either outside the primary display in an unused area such as overscan or even in a portion of the primary GUI directly or by time division multiplexing, directly by communication with the video memory, or by bypassing at least a portion of the video memory to create a new video memory. In other words, the present invention may provide one or more secondary user interfaces outside of the control of the system, such as the operating system, which controls the primary GUI.

Additional user interfaces may be used for a variety of different purposes. For example, a secondary user interface may be used to provide simultaneous access to the Internet, full motion video, and a conference channel. A secondary user interface may be dedicated to a local network or multiple secondary user interfaces may provide simultaneous access and data for one or more networks to which a particular computer may be connected.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

We claim:

1. A method in a computer system for enabling unobscured display of output on a video display system, the computer system having an operating system display interface that enables an operating system user interface to display data on a first display area of the video display system under control of the operating system, the output for unobscured display generated from a network associated with the computer system, comprising:

adjusting the display parameters of the video display system to create a second display area not under control of the operating system, the second display area being capable of displaying output that is not obscured by output from the operating system display interface; and writing the output generated from the network to the second display area so that the output generated from the network is displayed in conjunction with the operating system user interface.

2. The method of claim 1 wherein an online connection to the network is reestablished automatically when the displayed output generated from the network is accessed in a manner that indicates that the displayed output is to be updated from the network.

3. The method of claim 1 wherein the displayed output is a web page from the Internet.

4. The method of claim 1 wherein the displayed output includes an input field associated with a search engine, and further comprising:

receiving a network search request that has been entered into the input field;

sending the received search request to the search engine;

receiving search results from the search engine; and displaying the search results on the second display area.

5. The method of claim 1 wherein the displayed output includes an input field, and further comprising:

receiving an address of additional network data entered into the input field, wherein the data is any type of output;

sending the received address over the network to retrieve the additional data;

receiving the additional data; and displaying the received additional data on the second display area.

6. The method of claim 1 wherein the network generated output is displayed in both the first display area and the second display area, thereby prohibiting a portion of the network generated output from being overwritten by the operating system user interface.

7. The method of claim 1 wherein the adjusting the display parameters of the video display system operates by changing the resolution of the video display system and reducing the size of the first display area available to the operating system user interface.

8. A network portal in a computer system for enabling unobscured display of output generated from a network on a video display system, the computer system having an operating system display interface that enables an operating system user interface to display itself on a first display area of the video display system, comprising:

display area adjuster that adjusts the display parameters of the video display system to create a second display area that is capable of displaying output that is not obscured by output from the operating system display interface and which cannot be controlled by the operating system; and display transfer facility that writes the output generated from the network to the second display area so that the output generated from the network is displayed in conjunction with the operating system user interface.

9. The system of claim 8 wherein an online connection to the network is reestablished automatically when the displayed output generated from the network is accessed in a manner that indicates that the displayed output is to be updated from the network.

10. The system of claim 8 wherein the displayed output is a web page from the Internet.

11. The system of claim 8 wherein the displayed output includes an input field associated with a search engine, the system further comprising:

network search facility that receives a network search request that has been entered into the input field;

sends the received search request to the search engine;

receives search results from the search engine; and displays he search results on the second display area.

12. The system of claim 8 wherein the displayed output includes an input field, the system further comprising:

network browse facility that receives an address of additional network data that has been entered into the input field, wherein the data comprises any type of output;

sends the received address over the network to retrieve the additional network data;

receives the additional data; and displays the received data on the second display area.

13. The system of claim 8 wherein the display transfer facility writes the network generated output to both the first display area and the second display area, thereby prohibiting a portion of the network generated output from being overwritten by the operating system user interface.

14. The system of claim 8 wherein the display area adjuster creates the second display area by changing the resolution of the video display system and by reducing the size of first display area available to the operating system user interface.

15. A computer-readable memory medium containing instructions for controlling a computer processor of a computer system to display unobscured output of a video display system, the computer system having an operating system display interface that enables an operating system user interface to display itself on a first display area of the video display system, the output for unobscured display generate from a network associated with the computer system, by:

adjusting the display parameters of the video display system to create a second display area that is capable of displaying output that is not obscured by output from the operating system display interface and which cannot be controlled by the operating system; and writing the output generated from the network to the second display area so that the output generated from the network is displayed in conjunction with the operating system user interface.

16. The computer-readable memory medium of claim 15 wherein an online connection to the network is reestablished automatically when the displayed output generated from the network is accessed in a manner that indicates that the displayed output is to be updated from the network.

17. The computer-readable memory medium of claim 15 wherein the displayed output is a web page from the Internet.

18. The computer-readable memory medium of claim 15 wherein the displayed output includes an input field associated with a search engine, and further comprising:

receiving a network search request that has been entered into the input field;

sending the received search request to the search engine;

receiving search results from the search engine; and displaying the search results on the second display area.

19. The computer-readable memory medium of claim 15 wherein the displayed output includes an input field, and further comprising:

receiving an address of additional network data entered into the input field, wherein the data is any type of output;

sending the received address over the network to retrieve the additional data;

receiving the additional data; and displaying the received additional data on the second display area.

20. The computer-readable memory medium of claim 15 wherein the network generated output is displayed in both the first display area and the second display area, thereby prohibiting a portion of the network generated output from being overwritten by the operating system user interface.

21. The computer-readable memory medium of claim 15 wherein the adjusting the display parameters of the video display system operates by changing the resolution of the video display system and reducing the size of the first display area available to the operating system user interface.

22. A method in a computer system for displaying designated output on a video display system, the computer system having an operating system display interface that enables an operating system user interface to display itself on a first display area of the video display system, comprising:

adjusting the display parameters of the video display system in a manner transparent to the operating system to create a second display area that is capable of displaying output that is not obscured by output from the operating system display interface; and writing the designated output to the second display area so that the designated output is displayed in conjunction with the operating system user interface, wherein the method is performed by one of a service of the operating system and an application program.

23. The method of claim 22 wherein, when the method is performed as a service of the operating system, the displayed output appears to be displayed as part of the operating system initialization of the video display system.

24. The method of claim 22 wherein, when the method is performed by launching an application program, the displayed output appears to be displayed on the second display area when the application program is launched.

25. The method of claim 22 wherein the adjusting of the display parameters is performed by function calls to device driver software that communicates with the video display system.

26. The method of claim 22 further comprising reducing the size of the first display area.

27. The method of claim 22 wherein a portion of the output displayed in the second display area appears to continuously overwrite the user interface displayed in the first display area while the output is displayed in the second display area.

28. The method of claim 22 wherein the adjusting the display parameters operates by changing the resolution of the video display system and reducing the size of the first display area available to the operating system user interface.

29. A display controller in a computer system having an operating system display interface that enables an operating system user interface to display itself on a first display area of a video display system, comprising:

display adjustment facility that adjusts the display parameters of the video display system in a manner transparent to the operating system to create a second display area that is capable of displaying output that is not obscured by output from the operating system display interface; and display transfer mechanism that writes designated output to the second display area so that the designated output is displayed in conjunction with the operating system user interface wherein the display controller is invoked as one of a service of the operating system and an application program.

30. The display controller of claim 29 wherein, when the display controller is invoked as a service of the operating system, the display transfer mechanism appears to display the designated output as part of the operating system initialization of the video display system.

31. The display controller of claim 29 wherein, when the display controller is invoked by launching an application program, the display transfer mechanism appears to display the designated output on the second display area when the application program is launched.

32. The display controller of claim 29 wherein the display adjustment facility adjusts the parameters of the video display system by performing function calls to device driver software that communicates with the video display system.

33. The display controller of claim 29 wherein the display adjustment facility reduces the size of the first display area.

34. The display controller of claim 29, wherein a portion of the output displayed in the second display area appears to continuously overwrite the user interface displayed in the first display area, while the display transfer mechanism displays the output in the second display area.

35. The display controller of claim 29 wherein the display adjustment facility adjusts the display parameters by changing the resolution of the video display system and reducing the size of the first display area available to the operating system user interface.

36. A computer-readable memory medium containing instructions for controlling a computer processor in a computer system to display designated output on a video display system, the computer system having an operating system display interface that enables an operating system user Interface to display itself on a first display area of the video display system, by:

adjusting the display parameters of the video display system in a manner transparent to the operating system to create a second display area that is capable of displaying output that is not obscured by output from the operating system display interface; and writing the designated output to the second display area so that the designated output is displayed in conjunction with the operating system user interface; wherein the instructions are performed by one of a service of the operating system and an application program.

37. The computer-readable memory medium of claim 36 wherein, when the instructions are performed as a service of the operating system, the displayed output appears to be displayed as part of the operating system initialization of the video display system.

38. The computer-readable memory medium of claim 36 wherein, when the instructions are performed by launching an application program, the displayed output appears to be displayed on the second display area when the application program is launched.

39. The computer-readable memory medium of claim 36 wherein the adjusting of the display parameters is performed by function calls to device driver software that communicates with the video display system.

40. The computer-readable memory medium of claim 36, further comprising reducing the size of the first display area.

41. The computer-readable memory medium of claim 36 wherein a portion of the output displayed in the second display area appears to continuously overwrite the user interface displayed in the first display area while the output is displayed in the second display area.

42. The computer-readable memory medium of claim 36 wherein the adjusting the display parameters operates by changing the resolution of the video display system and reducing the size of the first display area available to the operating system user interface.

* * * * *